(12) United States Patent
Hugh et al.

(10) Patent No.: US 7,203,910 B1
(45) Date of Patent: Apr. 10, 2007

(54) METHOD AND APPARATUS FOR ORGANIZING AND PROCESSING INFORMATION USING A DIGITAL COMPUTER

(75) Inventors: Harlan Hugh, Los Angeles, CA (US); Errolson Hugh, Munich (DE); Michael Cozad, Seattle, WA (US)

(73) Assignee: Thebrain Technologies LP, Marina Del Rey, CA (US)

( * ) Notice: Subject to any disclaimer, the term of this patent is extended or adjusted under 35 U.S.C. 154(b) by 0 days.

(21) Appl. No.: 09/236,057

(22) Filed: Jan. 22, 1999

Related U.S. Application Data

(63) Continuation-in-part of application No. 08/747,092, filed on Nov. 7, 1996, now Pat. No. 6,037,944.

(51) Int. Cl.
*G06F 3/00* (2006.01)

(52) U.S. Cl. ................. 715/804; 715/738; 715/854

(58) Field of Classification Search ........... 345/326, 345/358, 853–855, 705–709, 835–838, 819–820, 345/804–805; 707/10, 1, 2, 102, 203; 715/705–712, 715/734–739, 789–792, 853–855, 804–805, 715/802, 803, 767, 850, 740
See application file for complete search history.

(56) References Cited

U.S. PATENT DOCUMENTS

| | | | | |
|---|---|---|---|---|
| 4,974,173 A | | 11/1990 | Stefik et al. | ................. 364/521 |
| 5,220,657 A | | 6/1993 | Bly et al. | .................... 395/425 |
| 5,459,831 A | | 10/1995 | Brewer et al. | ............... 395/155 |
| 5,506,937 A | | 4/1996 | Ford et al. | ..................... 395/12 |
| 5,544,354 A | * | 8/1996 | May et al. | .................... 345/854 |
| 5,548,722 A | * | 8/1996 | Jalalian et al. | ........... 395/200.1 |
| 5,555,354 A | | 9/1996 | Strasnick et al. | ........... 395/127 |
| 5,566,069 A | * | 10/1996 | Clark et al. | ..................... 702/2 |
| 5,721,910 A | * | 2/1998 | Unger et al. | ................. 345/853 |
| 5,751,965 A | * | 5/1998 | Mayo et al. | ................. 709/224 |
| 5,777,614 A | * | 7/1998 | Ando et al. | .................. 345/333 |
| 5,812,134 A | * | 9/1998 | Pooser | ........................ 345/356 |
| 5,819,245 A | * | 10/1998 | Peterson et al. | .............. 706/16 |
| 5,832,071 A | * | 11/1998 | Voelker | ....................... 379/165 |
| 5,889,520 A | * | 3/1999 | Glaser | ........................ 345/349 |
| 5,950,011 A | * | 9/1999 | Albrecht et al. | ............ 717/167 |
| 5,953,724 A | * | 9/1999 | Lowry | ........................ 707/102 |
| 6,031,537 A | * | 2/2000 | Hugh | ......................... 345/357 |
| 6,073,139 A | * | 6/2000 | Jain et al. | ................... 707/203 |
| 6,115,713 A | * | 9/2000 | Pascucci et al. | .............. 707/10 |
| 6,166,738 A | * | 12/2000 | Robertson et al. | .......... 345/355 |
| 6,188,405 B1 | * | 2/2001 | Czerwinski et al. | ........ 345/339 |
| 7,013,435 B2 | * | 3/2006 | Gallo et al. | ................. 715/850 |
| 2002/0145624 A1 | * | 10/2002 | Szlam et al. | ................ 345/738 |

FOREIGN PATENT DOCUMENTS

| | | |
|---|---|---|
| DE | 44 40 598 C1 | 5/1996 |
| EP | 0 273 435 A2 | 7/1988 |
| EP | 0 325 777 A2 | 8/1989 |

OTHER PUBLICATIONS

Halasz et al., "NoteCards in a Nutshell", 1987, pp. 45-52, ACM.

Carolyn L. Foss, "Tools For Reading And Browsing Hypertext", 1989, pp. 407-418, *Information Processing & Management*, vol. 25, No. 4.

Olsen et al., "Visualization of a Document Collection: The Vibe System", vol. 29, No. 1, Jan. 1993, pp. 69-81, *Information Processing & Management*.

Kent, et al., "Creating A Web Analysis and Visualization Environment", vol. 1, No. 28, Dec. 1995, pp. 109-117, *Computer Networks and ISDN Systems*.

Carr et al., "Open Information Services", vol. 28, No. 11, May 1996, pp. 1027-1036, *Computer Networks and ISDN Systems*.

* cited by examiner

*Primary Examiner*—Steven Sax
(74) *Attorney, Agent, or Firm*—Liu & Liu

(57) ABSTRACT

A method and apparatus for organizing and processing pieces of interrelated information (or "thoughts") using a digital computer is disclosed. The invention employs a graphical user interface to facilitate user interaction with highly flexible, associative "matrices" that enable users conveniently to organize digitally-stored thoughts and their network of interrelationships. Each of the thoughts may be affiliated with one or more application programs, such as a word processing or spreadsheet utility, or an Internet browser. Users are able conveniently to select a current thought along with any applications or content associated with that thought by interacting with the graphical representation. That representation is automatically reoriented about the selected thought, and is revised to reflect only those thoughts having predetermined relations to that current thought. Users can easily modify the matrix by interactively redefining relations between thoughts. Further aspects of the invention include techniques permitting automated generation of thought matrices, delayed loading to facilitate navigation amongst thoughts without undue delay due to bandwidth constraints, and matrix division and linking to allow optimal data structure flexibility. The present invention is interoperable with computer networks including the Internet, and offers an intuitive scalable methodology for the navigation and management of essentially immeasurable information resources and knowledge bases that transcends the limitations inherent in traditional hierarchical approaches. Thought matrices may conveniently be published and shared by multiple users under another aspect of the present invention. Still another aspect enhances communications amongst computer network users by sharing information about users' navigation amongst shared thoughts. The present invention offers advantages over prior art methods when speech is used to control a computer. Lastly, another aspect of the present invention provides users of a computer network automatically to receive custom content in response to their navigation of network files, without modifying those files.

53 Claims, 33 Drawing Sheets

```
boolean CheckForIsolation(int centralThought, int targetThought)
{
        // this function checks if centralThought is related to targetThought
        // via any of targetThought's relations (not directly)

// remove centralThought as a direct relation from targetThought
        RemoveRelation(targetThought, centralThought);

// create an empty thought list to keep track of the search
        intList searchList = CreateEmptyList();

// start recursive searches on each of targetThought's direct relations
        int relation = GetFirstRelation(targetThought);
        boolean found;
        do {
                found = Search(relation, centralThought, searchList);
                if(found) {
                        // centralThought was found, no need to search any further
                        break;
                }
                // this loop will end when there are no more relations
        } while(relation = GetNextRelation(targetThought));

// add centralThought back onto targetThought as a relation
        AddRelation(targetThought, centralThought);

return found;
}
```

Fig. 10

```
boolean Search(source, dest, searchList)
{
        if(Find(source, searchList)) {
                // source has already been searched
                return FALSE;

}

// add source to the searchList
        Add(source, searchList)

if(source == dest) {
                // this is the destination, we have found it
                return TRUE;

}

// recursive searches on each of sources direct relations
        int relation = GetFirstRelation(source);
        boolean found;
        do {
                found = Search(relation, dest, searchList);
                if(found) {
                        // centralThought was found, no need to search any further
                        break;

}
                // this loop will end when there are no more relations
        } while(relation = GetNextRelation(targetThought);

return found;

```
ForgetThought (fNum)
{
  // mark all the children of the selected thought
  list.Clear();
  MarkChildren(fNum, list);
  // unmark the active thought
  list.RemoveThought(activeThought);
  // unmark thoughts with unmarked parents
  lNum = list.GetFirstNum();
  while(lNum !=0)
  {
    if(lNum != fNum)  // don't unmark the selected thought
    {
      pNum = GetFirstThoughtParent(lNum);
      while(pNum != 0)
      {
        if(list.Contains(pNum) == FALSE)
        {
          if(IsThoughtInLongTermMemory(pNum)   == FALSE)
          {
            // unmark all the children of the unmarked parent
            childList.Clear();

MarkChildren(pNum, childList);
            list.RemoveList(childList);
          }
        }
        pNum = GetNextThoughtParent(lNum);
      }
    }
    lNum = list.GetNextNum();
  }
  // now forget all the thoughts left on the list
  lNum = list.GetFirstNum();
  while(lNum != 0)
  {
    ForgetThought(lNum);
    lNum = list.GetNextNum();
  }
}

RememberThought(rNum)
{
  // mark all the children of the selected thought
  list.Clear();
  MarkChildren(rNum, list);
  // remember all the thoughts on the list
  lNum = list.GetFirstNum();
  while(lNum != 0)
  {
    RememberThought(lNum);
    lNum = list.GetNextNum();
  }
}

MarkChildren(num, list)
{
  list.AddThought(num);
  cNum = GetFirstChild(num);
  while(cNum != 0)
  {
    MarkChildren(cNum, list);
    cNum = GetNextChild(num);
  }
}
```

FIG. 17

Algorithm for drawing the plex with distant thoughts

1.     Create a list of thoughts to be drawn and their screen locations:
2.         Add the central thought to the list.
3.         Add children to the list.
4.         Add parents to the list.
5.         Add jumps to the list.
6.         Add siblings to the list, checking first that they are not already on the list.
7.         Add distants of children to the list, checking first that they are not already on the list.
8.         Add distants of parents to the list, checking first that they are not already on the list.
9.         Add distants of jumps to the list, checking first that they are not already on the list.
10.        Add distants of siblings to the list, checking first that they are not already on the list.
11.    Draw the lines that connect each thought:
12.         For each item in the list:
13.             Get each item in the list:
14.                 If the two items are related, draw lines between them from and to the appropriate gates.
15.    Draw the distant thoughts:
16.         For each item in the list:
17.             If it is a distant thought, draw it.
18.    Draw the other thoughts:
19.         For each item in the list:
20.             If it is not a distant thought, draw it.

Fig. 23

```
// the non recursive method for searching thoughts
// tries to find a route from nSrc to nDest other than a direct relation
// returns TRUE if found
boolean Search(int nSrc, int nDest)
{
        //create the lists
        ThoughtList posList;      //list of thoughts that possibly connect
        ThoughtList notList;      //list of thoughts that do not connect
        //empty the lists
        posList.Initialize();
        notList.Initialize();

//add the source to the not list since we cannot go directly
        to the destination,
        notList.Add(nSrc);

//since we cannot go directly to the destination,
        //add all relates except the destination to the possible list
        Thought src(nSrc);
        for(int n = 0;;n++)
        {
                int nRel = src.GetRelate(n);
                if(!nRel)
                {
                        //no more relations, done
                        break;
                }
                if(nRel != nDest)
                {
                        //add it to the possibly connect list
                        posList.Add(nRel);
                }
        } while(TRUE)
        {
                //check the first possibility
                int nTest = posList.GetFirst();
                if(!nTest)
                {
                        //nothing on the list, done
                        break;
                }
                Thought test(nTest);
                if(test.IsRelated(nDest))
                {
                        //this one is related to the destination, we're done
                        return TRUE;
                }
                // does not connect, add it to the does not connect list
                notList.Add(nTest);
                // add all related thoughts except those already checked to
                possible list for
                (int n = 0;; n++)
                {
                        int nRel = test.GetRelate(n);
                        if(!nRel)
                        {
                                //no more relations, done
                                break;
                        }
                        if(!notList.Exists(nRel))
                        {
                                //not checked yet, add to possible list
                                posList.Add(rel);
                        }
                }
                //remove this one from the possible list
                posList.Remove(nTest);
        }
        //we've checked everything there is no other way to get from
        nSrc to nDest
        return FALSE;
}
```

Fig. 24

METHOD AND APPARATUS FOR ORGANIZING AND PROCESSING INFORMATION USING A DIGITAL COMPUTER

CROSS-REFERENCE TO RELATED APPLICATION

This application is a continuation-in-part of application Ser. No. 08/747,092, filed Nov. 7, 1996 now U.S. Pat. No. 6,037,944.

FIELD OF THE INVENTION

This invention relates to methods and apparatus for organizing and processing information, and more particularly, to computer-based graphical user interface-driven methods and apparatus for associative organization and processing of interrelated pieces of information, hereinafter referred to as "thoughts."

BACKGROUND

The general-purpose digital computer is one of the most powerful and remarkable information processing tools ever invented. Indeed, the advent of the digital computer, and the proliferation of a global digital information network known as the Internet, has thrust the world headlong into what is now recognized by many analysts as an "information era" and an "information economy," in which the ability to access and process information in an effective manner is one of the most important forms of economic power.

The potential impact of the digital computer and the Internet on information distribution and processing is undeniably revolutionary. Yet, conventional software environments are generally organized around metaphors and principles from earlier eras. Text-based operating systems like Microsoft® DOS essentially treat the computer as a giant filing cabinet containing documents and applications. A strictly hierarchical file directory provides a rigid, tree-like structure for this digital file cabinet. Individual documents are the "leaves" of this tree hierarchy. The directory structure generally does not include or express relationships between leaves, and users generally access documents and applications individually, using the directory structure. Even the now ubiquitous graphical "desktop" computing environment, popularized for personal computers by the Apple Macintosh® and Microsoft Windows® operating systems, for personal computers by the Apple Macintosh® and Microsoft Windows® operating systems, also simulates a traditional office environment. Individual documents and applications, represented by graphical icons, are displayed on the user's screen, to be accessed one-at-a-time. Once again, a strictly hierarchical, tree-like directory structure is imposed to organize the contents of the desktop.

Although the desktop and file cabinet metaphors have been commercially successful, the limitations and drawbacks of these traditional metaphors become clear when one considers the strikingly different way in which the world's other powerful information processing machine—the human brain—organizes information. Instead of being confined and limited to strictly hierarchical file directory structures, the human brain is thought to interconnect numerous pieces of information through flexible, non-hierarchical, associative networks. As those of skill and experience in the art are aware, it is often clumsy for users of traditional, prior art operating system interfaces to process multiple pieces of information if these pieces are contextually related in some way, but are stored in separate files and/or are associated with different application programs. Too often, the prior art of organizing information lead users to "misplace" information amongst hierarchical categories which often lose their relevance soon after the user creates them. Intended to assist users, traditional hierarchical structures and "desktop" metaphors compel users to organize their thought processes around their computer software, instead of the reverse. The inadequacy of "real-world," hierarchical metaphors for information management was recognized prior to the advent of the computer, but until now has not been successfully remedied.

The recent deluge of digital information bombarding everyday computer users from the Internet only heightens the need for a unified, simple information management method which works in concert with natural thought processes. Additionally, users' ready enthusiasm for the World Wide Web graphical "hypertext" component of the Internet demonstrates the appeal of associative, nonlinear data structures, in contrast to the limiting structure of computerized desktop metaphors. And yet, prior art web browsers and operating systems awkwardly compel users to navigate the associative, non-dimensional structure of the World Wide Web using linear, or at best hierarchical user interfaces. They are also limited in their ability to provide differentiated content to different users of shared content.

What is desired is an effective methodology for organizing and processing pieces of interrelated information (or "thoughts") using a digital computer. The methodology should support flexible, associative networks (or "matrices") of digital thoughts, and not be limited to strict, tree hierarchies as are conventional, prior art technologies. A related goal is to create an intuitive and accessible scheme for graphically representing networks of thoughts, providing users with access to diverse types of information in a manner that maximizes access speed but minimizes navigational confusion. That methodology should be optimized to enable users to seamlessly manage, navigate, and share such matrices consisting of files and content stored both locally on digital information devices, as well as remotely via digital telecommunications networks such as local area networks, wide area networks, and public networks such as the Internet. A final goal is to facilitate relationships amongst users by flexibly distributing information about other users of shared content, and availing differentiated content to different groups of users.

SUMMARY OF THE INVENTION

The present invention enables users to organize information on a digital computer in a flexible, associative manner, akin to the way in which information is organized by the human mind. Accordingly, the present invention utilizes highly flexible, associative matrices to organize and represent digitally-stored thoughts. A matrix specifies a plurality of thoughts, as well as network relationships among the thoughts. Because the matrix structure is flexible, each thought may be connected to a plurality of related thoughts. A graphical representation of a portion of the matrix is displayed, including a plurality of user-selectable indicia (such as an icon) corresponding to the thoughts, and in some embodiments, a plurality of connecting lines corresponding to the relationships among the thoughts. Each of the thoughts may be associated with at least one thought document, which itself is associated with a software application program. Users are able to select a current thought conveniently by interacting with the graphical representation, and the current thought is processed by automatically invoking the application program associated with the current thought document in a transparent manner. Upon the selection of a new current thought, the graphical representation of the displayed portion of the matrix (the "plex") is revised to reflect the new current thought, all thoughts having predetermined relations to that current thought, and the relations therebetween. Users can modify the matrix by interactively redrawing the connecting lines between thoughts, and relationships within the matrix are then redefined accordingly. Further aspects of the invention include techniques permitting automated generation of thought matrices, delayed thought loading to facilitate navigation through a plex without undue delay due to bandwidth constraints, and matrix division and linking to allow optimal data structure flexibility. The present invention is also particularly well suited for use in conjunction with speech recognition in the manner disclosed. The present invention also is interoperable with digital communications networks including the Internet, offers an intuitive methodology for the navigation and management of essentially immeasurable information resources that transcends the limitations inherent in traditional hierarchical-based approaches, facilitates communications amongst users of shared network content, and permits the rapid publishing of content references by users and the exploitation of data based upon those communications and publishing activities. Finally, the present invention activates plex displays and other levels of differentiated content in parallel with a user's navigation amongst primary shared network content.

BRIEF DESCRIPTION OF THE DRAWINGS

FIG. 10 discloses an algorithm which may be implemented in an embodiment of the present invention.

FIG. 17 sets forth algorithms for implementing forgetting and remembering operations that are used with one embodiment of the present invention.

FIG. 23 illustrates a method for drawing a plex having distant thoughts.

FIG. 24 illustrates an alternative algorithm for searching thoughts that may be implemented in an embodiment of the present invention.

NOTATION A NOMENCLATURE

Figure 1:
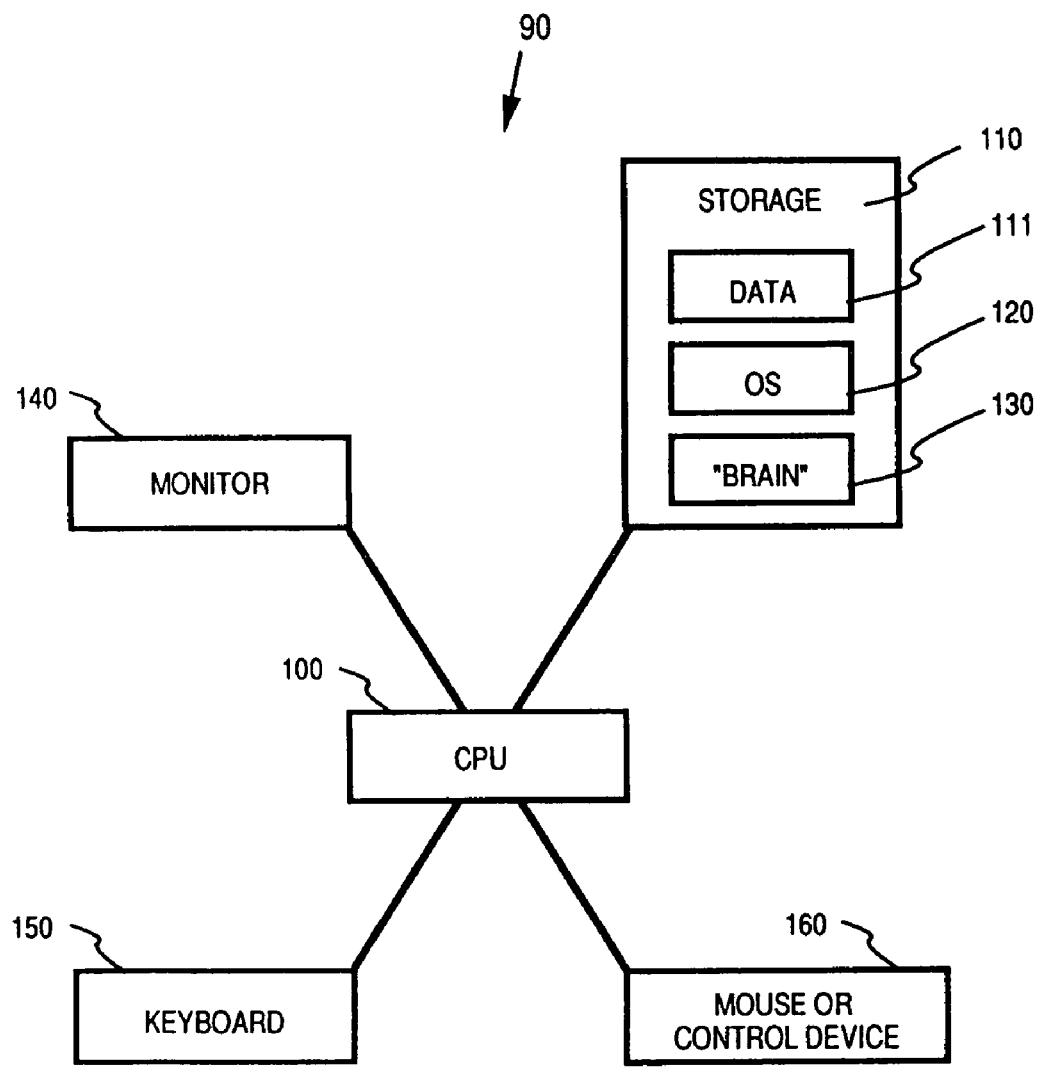
FIG. 1 illustrates the basic architecture of a computer system for use in implementing one embodiment of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below.

One aspect of the present invention relates to the organization, storage, and retrieval of information with highly-flexible associative data structures, and it is therefore convenient to explain the disclosed processes by analogy to processes commonly associated with human cognition. For example, as explained above, items of information that are processed in accordance with the present invention are referred to by the label "thoughts," and designations such as "forgetting" are used metaphorically to refer to functions or relations relating to the associative data structure of the present invention. These analogies are employed merely to facilitate explanation of the present disclosure. Based on everyday assumptions regarding the way humans think, the distinctions between the presently disclosed computer-implemented invention and actual human cognitive operations must not be overlooked. The interrelations among these thoughts are sometimes similarly defined by reference to genealogically-derived terms such as "parent" and "child" thoughts. In the spirit of the present invention, the assignment of these terms is based largely on human intuition, as they reflect relations between thoughts that may easily be grasped by users not proficient with the use of non-traditional information storage schemes. The terms are merely labels that serve to enhance the clarity of the disclosure. They should not be construed as restricting the flexibility of the described information storage structure.

DETAILED DESCRIPTION OF THE INVENTION

General System Architecture

FIG. 1 depicts the general architecture of a digital computer system 90 for practicing the present invention. Processor 100 is a standard digital computer microprocessor, such as a CPU of the Intel x86 series. Processor 100 runs system software 120 (such as Microsoft Windows®, Mac OS® or another graphical operating system for personal computers), which is stored on storage unit 110, e.g., a standard internal fixed disk drive. Software 130, also stored on storage unit 110, includes computer program code for performing the tasks and steps described below, including the digital representation of matrices, the display of graphical representations of such matrices, and the processing of such matrices in accordance with the principles of the present invention. Display output, including the visual graphical user interface ("GUI") discussed below, is transmitted from processor 100 to an output device such as a video monitor 140 for display to users. Users utilize input devices such as standard personal computer keyboard 150, cursor control device 160 (e.g., a mouse or trackball), touch-screen sensors on the monitor display, virtual reality gloves, voice input, or similar techniques to enter the GUI input commands discussed below, which are then transmitted to processor 100. Software for implementing the present invention may be stored in a variety of locations and in a variety of mediums, including without limitation, RAM, data storage 111, a network server, a fixed or portable hard disk drive, an optical disk, or a floppy disk.

Internal Implementation of a Thought

Figure 2:
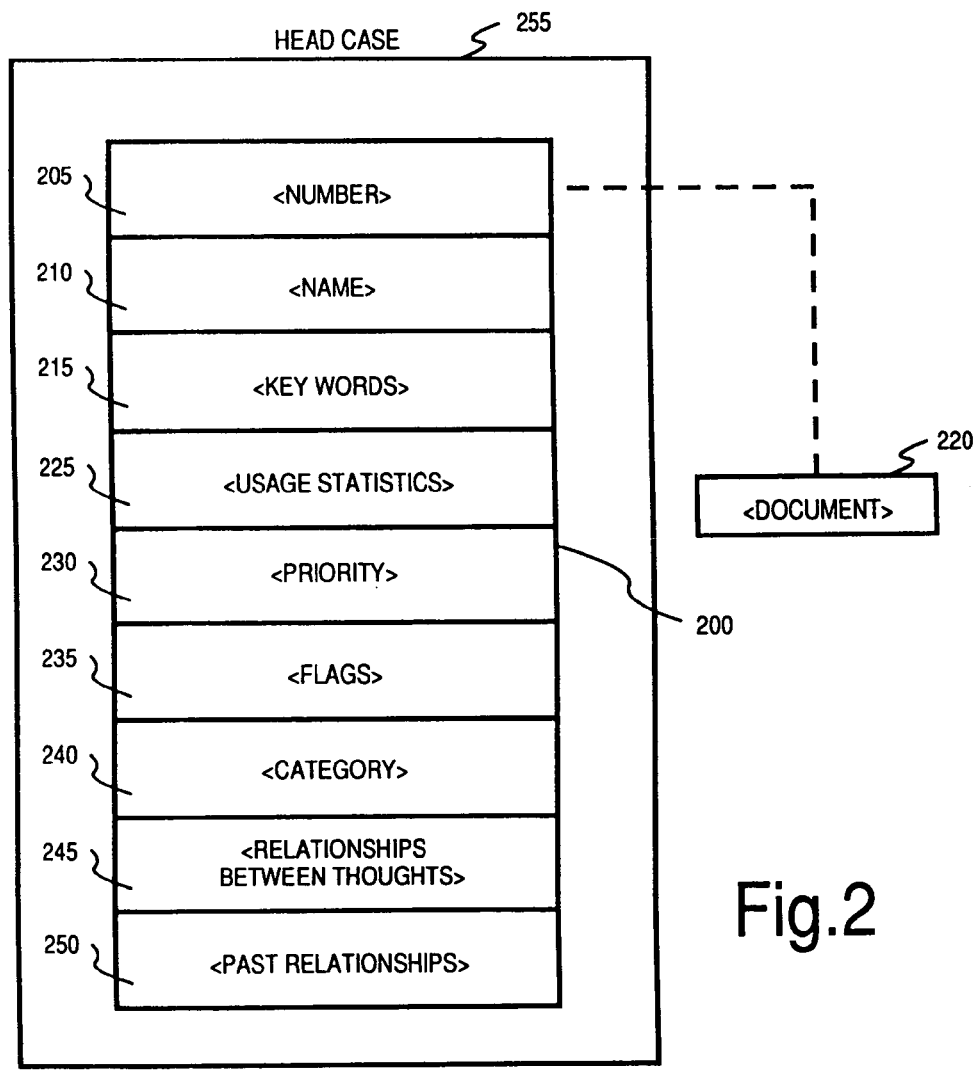
FIG. 2 illustrates one embodiment of the data architecture for thoughts, in accordance with the present invention.

In one embodiment of the present invention as illustrated in FIG. 2, a plurality of interrelated thoughts collectively make up a "thought." Each such thought (i.e., a piece of information, such as a collection of spreadsheet data) is represented internally as comprising various elements, including properties and relationships. Properties can include, as in the example of thought 200: number 205, name 210, key words 215, document 220, usage statistics 225, priority 230, flags 235, category 240. Relationships can include currently linked thoughts 245 and past linked thoughts 250. Except for document 220, all of the data for all thoughts is stored in a set of files 255 (which we designate "the headcase" in one embodiment), which is invisible to the user and is transparently loaded to RAM and saved to data storage 111 as the user works.

Number 205. Each thought has a unique number which, in some embodiments of the present invention, is invisible to the user but is used internally, by other thoughts or lists, to reference the thought. References to each thought thus occupy only a small amount of internal storage, and changes to a thought's user-specified name do not affect internal references.

Name 210. The "name" of a thought is intended to be a brief, textual description of that thought, written by the user. One purpose of a name is to enable users to identify the associated thought in a convenient manner.

Key Words 215. The "key words" of a thought are a list of descriptive terms inputted by the user, which list may be interactively searched using the search methods described in more detail below (see "Searching").

Document 220. Each thought includes an associated "document," which stores all of the specific content for that thought, such as word processing data or spreadsheet data. Each such document is stored internally in its own file in data storage 111 or separately stored in mass storage devices accessible by the computer system.

In some embodiments of the invention, the document name is based on the associated thought's number. In other embodiments, the document name may be based on the name of the associated thought. More particularly, the document name can be the same as the thought name, unless a preexisting file with the identical name already exists. If such a file already exists, the method of the present invention can name the location by appending a number to the name.

For some embodiments of the present invention used with operating systems that use filename extensions, the extension for the location may be determined by the thought type in accordance with common practices in the art, for example, ".tht" for thought editor documents, and ".htm" for web pages.

When the name of a thought is changed, the location of the document it references is not changed. This allows the user to use the location to share the file with users who are not using the method of the present invention and therefore must access these files through traditional operating system methods. Of course, a user may edit the location of a document by the same methods used to edit all other thought properties. If the user makes the location point to a nonexistent or unsupported file, the software of the present invention will be unable to edit the document. The referenced file may be either locally or remotely located.

Referenced files may also be used as sources for Microsoft Windows® drag and drop operations known in the art and extensively documented in Windows® Software Development Kits. These operations are capable of exchanging file locations between programs for the purpose of making references, embedding, copying, and pasting. By implementing these operations into the software of the present invention, a user can use the present invention as a drop source. A file stored using the present invention may thereby easily be copied to a Windows Explorer® folder or any other application supporting file drag and drop.

As discussed below, the user need not consciously manage these files. Instead, accessing a thought automatically provides the user with a seamless, transparent way of accessing the document contents, calendar information, notes and other information associated with thought, along with the appropriate application program(s) or utility(ies) for processing those contents.

Usage Statistics 225. "Usage statistics" may be generated and stored for each thought as the user works on that thought, as discussed in greater detail below in the "Additional Features" section.

Priority 230. A priority number set by the user indicates the relative importance of a particular thought. The priority is normally manually set by the user, but can be calculated based upon the usage statistics and the relationships at the user's request. The priority can then be used to filter thoughts when searching or creating thought lists.

Flags 235. Flags provide a mechanism for designating the state of each thought. In one embodiment of the invention, each flag can be in one of three states: on, off, or default. When a flag is in default, the thought value is determined by the category of thought (see Category, below). Flags can be user-defined, or may be automatically provided by the system. One example of a system flag is one that states whether a thought is part of long term memory.

Category 240. A thought's "category" is a number which designates a thought to be of a specific category. Thought categories are defined and named by the user. Each category specifies that thoughts of that category will have certain attributes or "fields," as well as certain default flag values (see the discussion of "flags" above). An example of a category might be "Person," in which case an example field might be "City of Residence." The use of fields to perform indexed searching is discussed in further detail below, in the "Processing Thoughts" section. Category definitions may be stored separately, as templates.

Relationships Between Thoughts 245. In one embodiment of the invention, at least three types of relationships are possible among thoughts: child, parent, and jump. Each thought includes a separate list for each type of relationship. The utility of enabling at least three types of links among thoughts is discussed more fully below. Each such relationship list stores a list of the other thoughts (identified by number) that are related to the instant thought by the instant type of relationship. The relationship lists are used to generate and navigate graphical representations of the matrix, as described in detail below, and are otherwise invisible to the user.

Past Relationships 250. In some embodiments of the invention, there is another set of at least three lists: for child, parent, and jump relationships, respectively, which archive information about those relationships which have been severed or "forgotten" but which may be reattached or remembered upon request by the user. Essentially, this provides a long term memory facility that allows users to recall previous relationships when desired, without cluttering the current display with non-current data, as discussed below.

Graphically Representing and Navigating a Matrix

Figure 3:
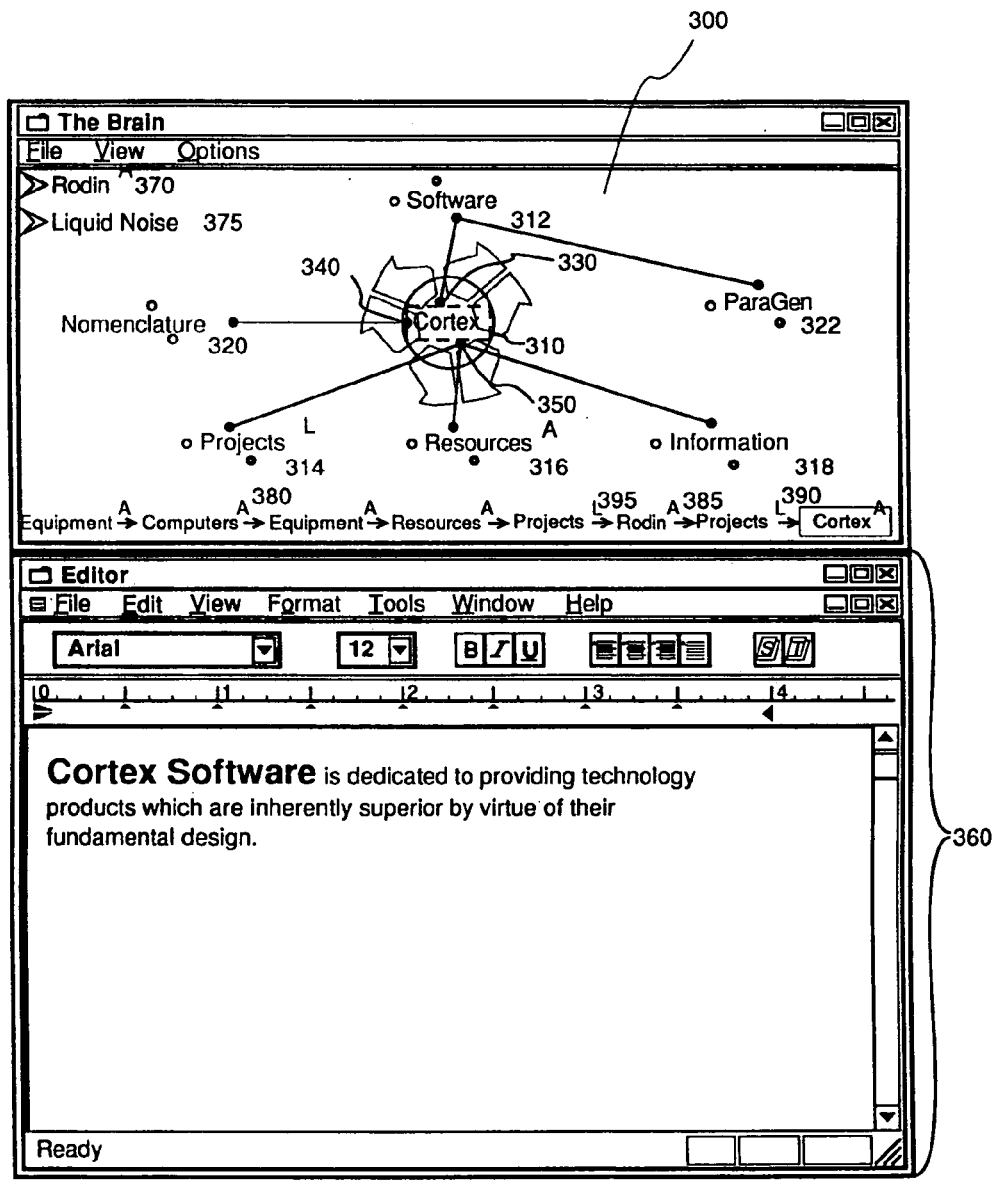
FIG. 3 illustrates a graphical user interface screen display, in accordance with an aspect of the present invention.
Figure 21:
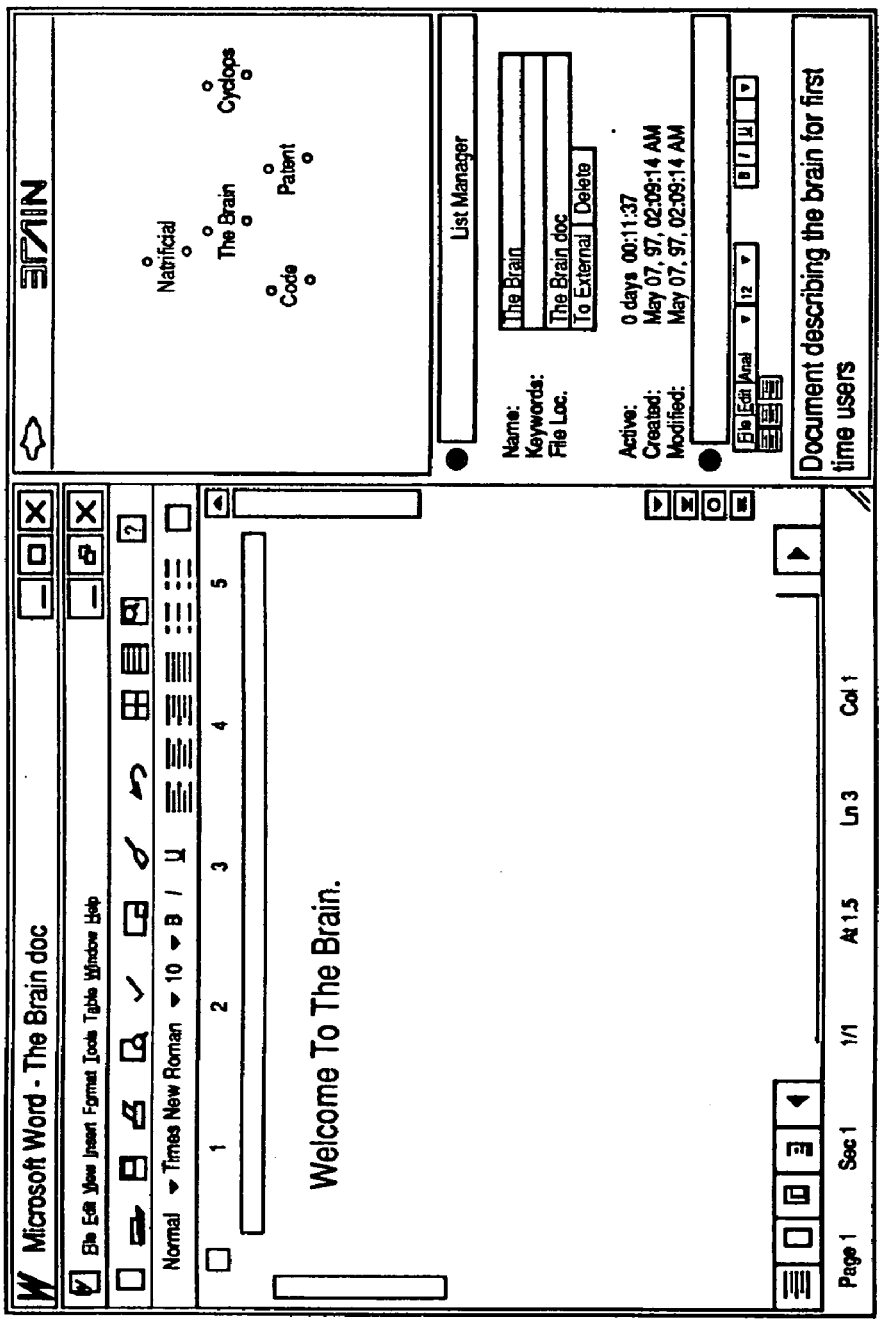
FIG. 21 illustrates an alternative graphical user interface screen display, in accordance with one embodiment of the present invention.

The present invention simultaneously enhances navigational efficiency through its strategic graphical arrangement of display icons representing thoughts. The placement of the thoughts reflects second-level relations that may not be as easily communicated by techniques employing arbitrary thought placement. FIG. 3 illustrates a typical, graphical representation ("plex 300") of a matrix of related thoughts which will be displayed on the monitor 140, in accordance with one embodiment of the present invention. FIG. 21 illustrates an example of an on-screen display of an alternative embodiment of the present invention, in which the plex is displayed in the upper-right-hand section of the screen, the thought document is on the left-hand portion of the screen, and properties, list manager, and notes windows are on the lower right section of the screen.

Thought Types and Interrelation. In the example of FIG. 3, central thought 310 labelled "Natrificial" is displayed in the center of the plex, preferably surrounded by a circle, a dashed rectangle, and a rotating or blinking graphic that visually draws attention to the central thought. Thoughts that are directly related to the central thought 310 are represented in the plex 300 by display icons connected by lines to the central thought. In one embodiment of the present invention, multiple categories or types of thought relationships can be specified, in the interests of providing users maximum organizational flexibility and clarity. Specifically, the present invention allows a plurality of parent thoughts, a plurality of child thoughts, a plurality of sibling thoughts, and a plurality of jump thoughts.

Sibling thoughts (such as the thought "ParaGen" 322), are child thoughts of any and all parent thoughts (such as the thought "Software" 312) of the current central thought ("Natrificial" 310). For example, in the embodiment illustrated in FIG. 3, above the central thought 310 are related parent thoughts. In this plex there is only one, "Software" 312. Below the central thought are child thoughts. In this plex there are three: "Projects" 314, "Resources" 316, and "Information" 318. To the left of the central thought are jump thoughts; in this plex there is only one: "Nomenclature" 320. Finally, to the right of the central thought are sibling thoughts which share a parent with the central thought. In this plex there is only one—"ParaGen" 322. The underlying significance and semantics of these or other categories of thought relationships is entirely unique to the individual practitioner and user. In one embodiment, parent thoughts are displayed in three columns extending upward from the central thought, jump thoughts are displayed in a single column extending upward from the central thought and to the left of the parents, and children are displayed in four columns beneath the central thought and extending downward.

Figure 25:
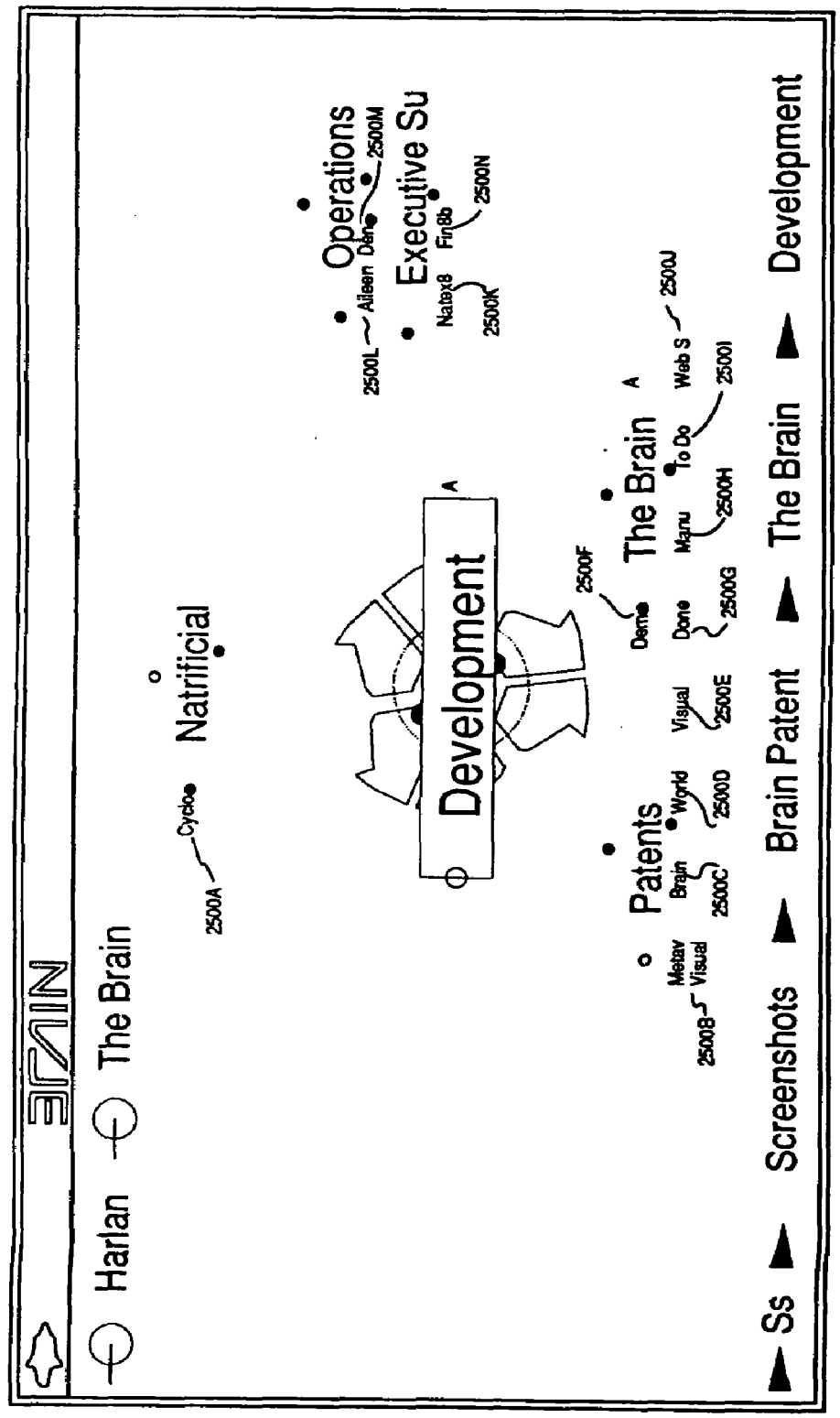
FIG. 25 illustrates a graphic user interface screen display containing distant thoughts.

The display of sibling thoughts is not required for navigation through a plex. For this reason, some embodiments of the present invention allow the user to elect in the preferences not to display siblings. Such an election may conserve display space, but will do so at the cost of displaying fewer available thoughts. One embodiment of the invention is configurable in the display preference settings to display other more distantly related thoughts (collectively "distant thoughts"), including grandparents, grandchildren, and partner thoughts. Grandparent thoughts are the parents of the parents, and may be displayed above the parents in two columns extending upward. Grandchildren are the children of the children, and are displayed below the children in four columns extending downward. Partners are the parents of the children, and may be displayed to the left of the active thought and below the jumps. If there are many partners or many jumps, the jumps may be shifted to accommodate the partners. Graphical representations of distant thoughts may be smaller than those for thoughts more directly related to the central thought, and may not contain gates from which relationships may be originated; these distant thoughts can be highlighted as the selection cursor passes over them. One method for graphically representing a plex having distant thoughts is outlined in FIG. 23. As this figure illustrates, this process includes generating a list of thoughts to be drawn and their respective screen locations, drawing connecting lines between these thoughts, and then drawing the thoughts themselves. FIG. 25 is an illustrative screen display having distant thoughts 2500A–N, as described above.

Parent, child and jump thoughts are all equally related insofar as each is directly linked to that central thought. The jump thought is unique in that no thought related to a jump thought is displayed within the plex, unless that thought is itself a parent, child, or sibling of the central thought. Sibling thoughts are secondary relations, connected to the central thought only indirectly through parent thoughts and children thoughts. The distinctions amongst the types of thought relationships can be symbolized within a single plex by displaying lines connecting the thoughts. Those distinctions achieve added significance in the plexes resulting from a user navigating the matrix, activating a different thought as the new central thought. Preserving the distinctions amongst types of thought relationships permits a data management structure which at once lends itself to easy, logical navigation-like hierarchical structures and yet enjoys the dimensionless and unlimited flexibility of a totally associative structure.

The differing relations among thoughts are reflected in the following general rules, which define the collection of thoughts graphically represented in a plex as well as the nature of this representation in some embodiments of the present invention.

Depending upon the defined interrelations between the old central thought and the newly selected central thought, the other thoughts in the old plex may be included or excluded from the new plex. The old central thought, however, will always remain in the new plex. Parent thoughts are related to all of their child thoughts, and child thoughts are related to one another. Therefore, when a child thought is selected, all the other children will remain in the plex as siblings. Likewise, when a parent is selected, the other children of the parent (i.e., some or all of the siblings of the current central thought) will remain in the plex. Furthermore, sibling thoughts are related to each other and their parents, so that when a sibling is selected, all of its siblings (some or all of the siblings of the original central thought) will remain in the plex as siblings.

Jump thought relationships link the jump thought with only the central thought and no other thoughts; therefore, when a jump thought is selected, typically only it and the current central thought will remain in the plex. Non-contextual links such as those inserted into hypertext are effectively the same as jump links, as they do not help to define relationships beyond those that are directly linked. The availability of such non-contextual links within, for example, hypertext documents, expands the breadth and enhances the flexibility of the presently disclosed invention and therefore increases its capacity to provide an optimally intuitive and adjustable structure for organizing information.

Graphical Representation of Matrix. In one embodiment of the invention, each thought in a plex has three circles near it. These circles are thought "gates" (e.g., gates 330, 340, and 350 in FIG. 3), and are used to show and create the relationships between thoughts. The location of each gate tells what kind of relationship it represents. Thus, gate 330 above thought 310 is for relationships to parent thoughts; gate 350 below thought 310 is for relationships to child thoughts; and gate 340 on the side of thought 310 is for relationships to jump thoughts. Note that each thought in the display of FIG. 3 is connected to central thought 310 by the appropriate gate. Each gate circle being used (i.e., a gate through which a thought is connected) may be filled (e.g., gate 330); if no thought is connected through a gate, that gate's circle is empty (e.g., gate 340). In addition, gates may be color-coded according to the currently displayed thoughts. For example, in one embodiment, if a gate is red (e.g., gate 350), this indicates that all the thoughts to which it connects are currently displayed. If a gate is green (e.g., gate 365), this indicates that there are other thoughts to which it is connected and which are not displayed within the plex at this time.

Display of the plex may be configured based upon the current thought. More specifically, the display positions of thoughts are determined by the way they are related and the number of thoughts that are related in that way. Thus, in one embodiment, the central thought (e.g., 310) is always drawn in the center. Above the central thought are the parent thoughts (e.g., 312), which are drawn in up to two columns extending upward. Below the central thought are the child thoughts (e.g., 314, 316, 318), which are drawn in up to four columns extending downward. The jump thoughts appear to the left in a single column which extends up and down until it hits the child thoughts, at which point it begins to extend only upward. Sibling thoughts appear to the right of the central thought in a single column which extends up and down until it hits the child thoughts, at which point it begins to extend only upward. In practice, the actual drawing sequence on screen may be performed as follows. First the background is cleared. The scaling circle and the lines that connect the thoughts are then drawn. Next, the lines are drawn between the locations of the gates representing the appropriate relationships. Finally, the actual thought names and the gates are drawn.

Occasionally a central thought will be linked to so many thoughts that it will be impossible to simultaneously display all thoughts in a plex. In one embodiment of the present invention, the software of the present invention will display arrows above and/or below thoughts with particular relations to thoughts that could not be accommodated on the display.

By clicking on or dragging these arrows, the user may scroll through the entire list of thoughts. When second-level thoughts are displayed, only those which are linked to the thoughts displayed will be displayed.

Figure 4:
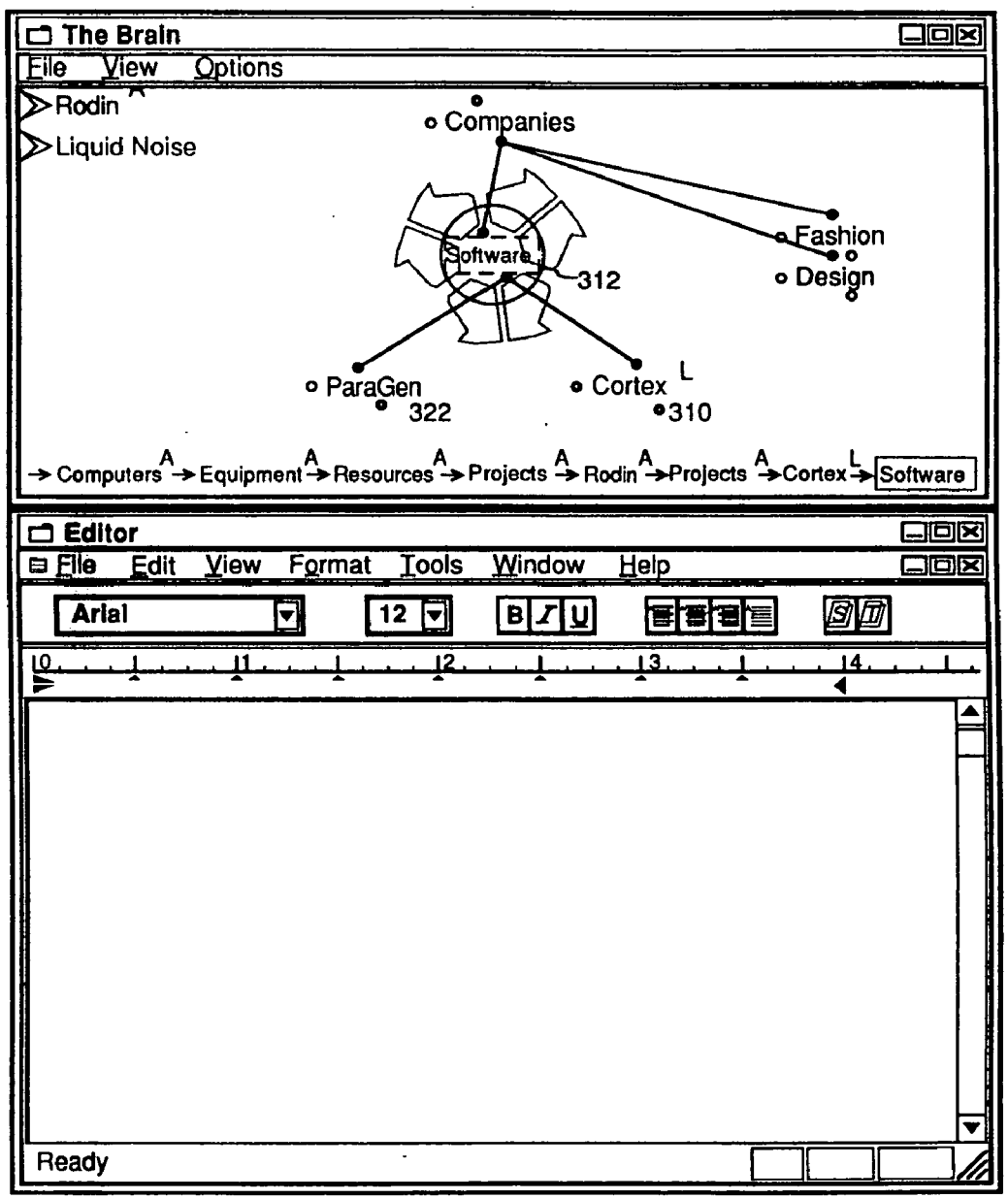
FIG. 4 illustrates the graphical user interface of FIG. 3, reflecting the selection of a new current thought by a user.

Matrix Navigation. Navigation and movement through the matrix is accomplished by selecting the thought to be moved to, using control device 160 or keyboard 150. In one embodiment, navigation is accomplished by selecting a thought indicium with a cursor control device such as a mouse. When a thought in the plex is selected to become the new central thought, the plex is rearranged according to the links associated with the newly selected central thought. In some embodiments, this process may be graphically reflected with animation showing the movement of the thoughts. For example, FIG. 4 shows the plex of FIG. 3, but rearranged after a user has interactively selected Software 312 as the new central thought, in place of Natrificial 310. Window 360 is used to display and edit the document for the current thought, as discussed below in the section entitled "Processing Thoughts."

One method of navigation using a keyboard utilizes the arrow keys in connection with other keys. In one particular embodiment, thoughts may be activated using a combination of the [Alt] key and the arrow keys. Upon the depression of the [Alt] key, a cursor is initially displayed over the central thought. Subsequent depression of the [Up] key may move the cursor to the closest parent, [Down] to the closest child, and so on. Within a group of thoughts, the arrow keys can be used to move the cursor among the group. The [Left] key may be assigned to return to the central thought from the siblings, and the [Right] may be assigned to return to the central thought from the jumps. The [Down] key will only return to the central thought from the parents if the cursor is over the bottom parent thought. The [Up] key will only return to the central thought from the children if the cursor is over the top child thought. If the display includes scrollbars, the [Up] and [Down] keys may be used to scroll. A selected thought may then be activated by the release of the [Alt] key, or in another embodiment, the [Alt] key may be pressed once to begin a thought selection routine and a second time to activate a selected thought.

Figure 18:
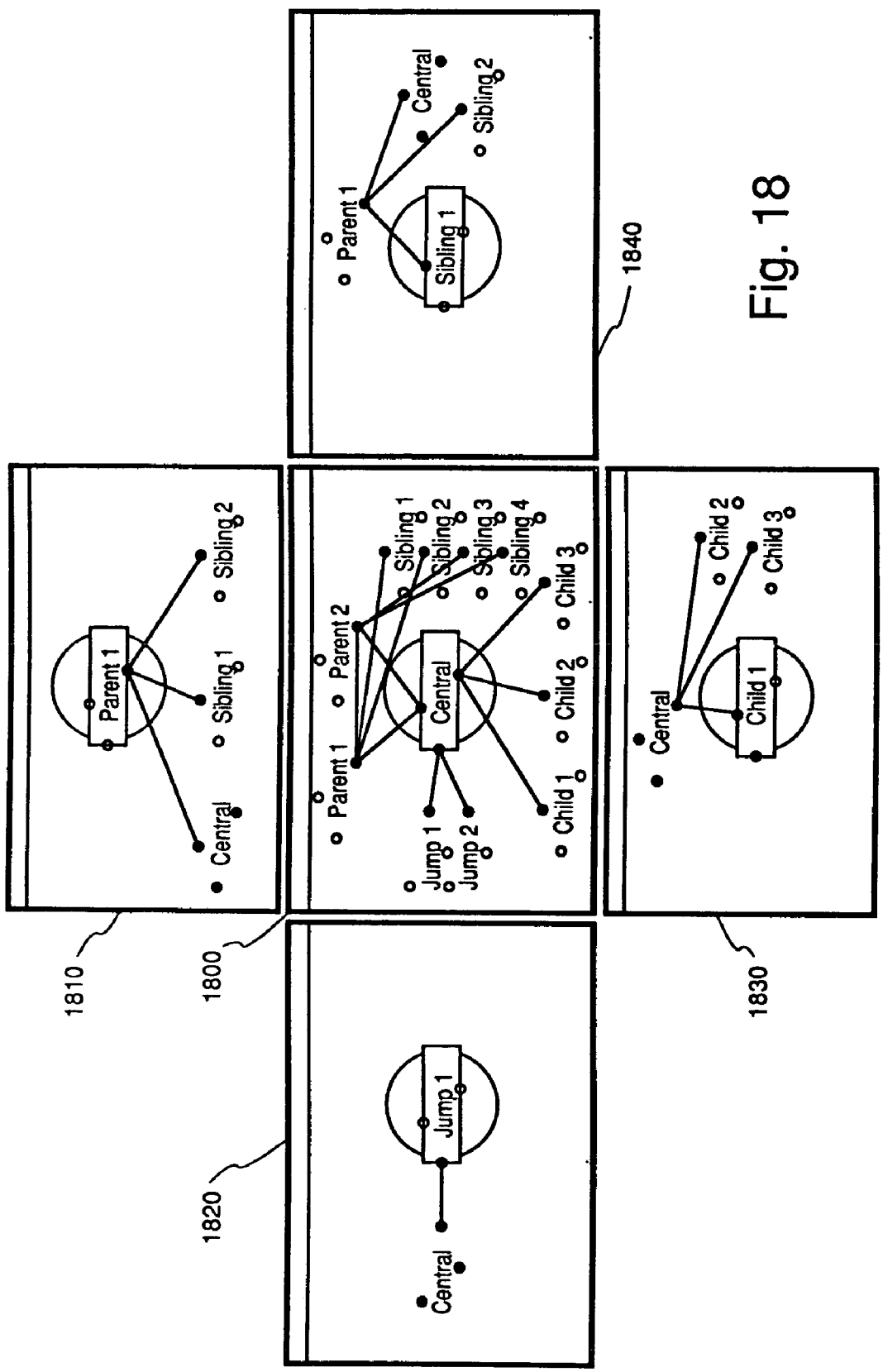
FIG. 18 depicts five interrelated screen displays of one embodiment of the present invention.

Navigation Example. FIG. 18 illustrates five related screen displays of one embodiment of the present invention. These connected displays demonstrate the practical significance of the novel interrelations among the different types of thought relationships of the present invention. Specifically, using differentiated types of thought relationships enhances the relevancy of the plex, by displaying only the most interrelated thoughts. The center screen 1800 illustrates a hypothetical plex, and each of the four screens bordering this hypothetical plex 1810, 1820, 1830, and 1840 illustrates the plex that would be displayed upon the user's selection of a particular one of the thoughts from the original hypothetical plex to be the central thought. As FIG. 18 shows, the original plex 1800 comprises a central thought ("Central") in the center of the plex, surrounded by and connected to a multiplicity of jump, parent, sibling, and child thoughts. For simplicity, this example presumes that, contrary to thoughts in a typical plex, none of the thoughts in the original plex are connected to any thought outside the original plex, and that each thought is connected to that central thought by only one type of thought relationship. Also for simplicity's sake, FIG. 18 assumes that sibling thoughts are the only indirect thought relationships displayed, and that the illustrated embodiment will not display distant thoughts.

The screen 1810 above the original plex illustrates the plex that would result if the user selected the "Parent 1" thought from the original plex. As FIG. 18 illustrates, the Parent 1 thought in the original plex was connected only to the central thought and to the thoughts labeled Sibling 1 and Sibling 2. Upon the selection of "Parent 1" from the original plex, the Parent 1 thought moves to the center of the plex display, and the thoughts linked thereto move accordingly into position around the Parent 1 thought. The names assigned to the thoughts in each of the five screens are based on the position of the thoughts in the original (center) plex, and were not changed so that one could follow the movement of each thought from the original plex to each of the peripheral plexes. Therefore, Sibling 1 and Sibling 2, which were siblings of the original central thought and therefore were displayed on the right-hand side of the plex, move into position under Parent 1 in the top plex because Sibling 1 and Sibling 2 are children of Parent 1 (the new central thought). As explained above, children thoughts are displayed at the bottom of the plex. The original central thought, labeled "Central," is also a child of Parent 1 and therefore is also displayed below Parent 1. Jump 1 and Jump 2 were related only to the central thought within the original plex, are not directly related to Parent 1, and are therefore not displayed within the new plex. Child 1, Child 2 and Child 3 are now grandchildren and are not displayed. Neither is Parent 2 which is now a partner, nor Siblings 3 and 4 which are related to Parent 1 only through three thought relationship links ("links").

The plex 1840 to the right of the original plex 1800 is the plex that would result upon the selection of Sibling 1 as the new central thought. Specifically, as shown in the original (center) plex, Sibling 1 is directly connected only to Parent 1. Therefore, the new plex shows Sibling 1 as the new central thought, with Parent 1 (Sibling 1's parent) connected above. Furthermore, because Sibling 1, Sibling 2 and Central share Parent 1 as a common parent, they are siblings of one another. Sibling 2 and Central are displayed as sibling thoughts to the right of Sibling 1 in the new plex. Again, Jump 1 and Jump 2 were related only to the central thought within the original plex, are not directly related to Sibling 1, and are therefore not displayed within the new plex. Child 1, Child 2 and Child 3, Parent 2, Sibling 3, and Sibling 4 are not displayed because each is at least three links removed.

The plex 1830 below the original plex 1800 is the plex that would result upon the selection of Child 1 as the new central thought. Specifically, as shown in the original (center) plex, Child 1 is directly connected only to the original central thought. Therefore, the new plex includes Child 1 as the new central thought and includes the original central thought as a parent thought displayed above Child 1 (because Child 1 is a child of Central, Central is a parent of Child 1). Furthermore, as the original plex shows, Child 1, Child 2, and Child 3 share Central as a common parent and therefore are all siblings. Thus, Child 2 and Child 3 are displayed as siblings of Child 1 on the right-hand side of the plex. Again, Jump 1 and Jump 2 were related only to the central thought within the original plex, are not related to Child 1, and are therefore not displayed within the new plex. Parents 1 and 2 would now be grandparents and are not displayed. Neither are Siblings 1, 2, 3 and 4 which are at least three links removed from Child 1.

The plex 1820 to the left of the original plex 1800 is the plex that would result upon the selection of Jump 1 as the new central thought. Specifically, as shown in the original (center) plex, Jump 1 is directly connected only to the original central thought, and is not directly related to any other thoughts in the original plex. Therefore, the resulting plex includes only Jump 1 as the new central thought and Central as a jump thought.

Advantages of Associative Interrelations. As this example graphically illustrates, the relatedness of particular thoughts is reflected in the manner in which those thoughts are displayed as the user navigates the matrix. By choosing one type of link over another, the user has the power to affect the content of the plexes that are displayed upon the selection of any thought from the current plex as the new central thought. The method of the present invention utilizes intuitively-derived thought interrelations and graphical representations to optimize the benefits human users will obtain from the present invention. Harnessing this power offers the user informational displays that are as or more relevant than hierarchical displays, yet free of the artificial spatial limitations inherent in hierarchies and "real world" metaphors.

Figure 19:
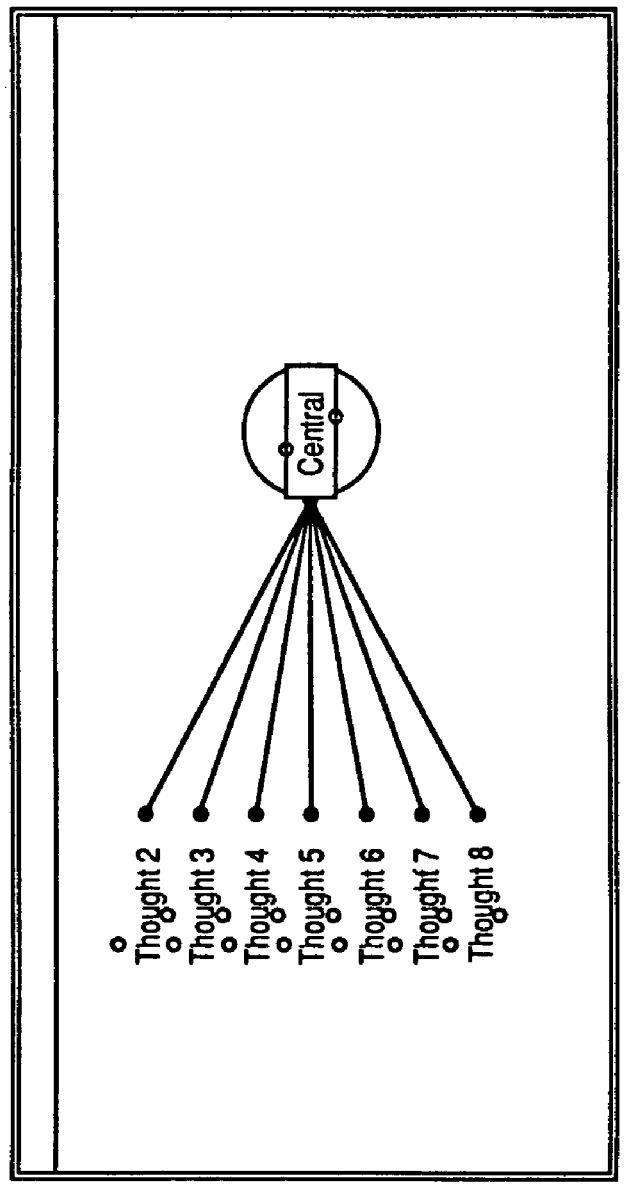
FIG. 19 illustrates a hypothetical screen display of an information storage arrangement having non-differentiated links.
Figure 20:
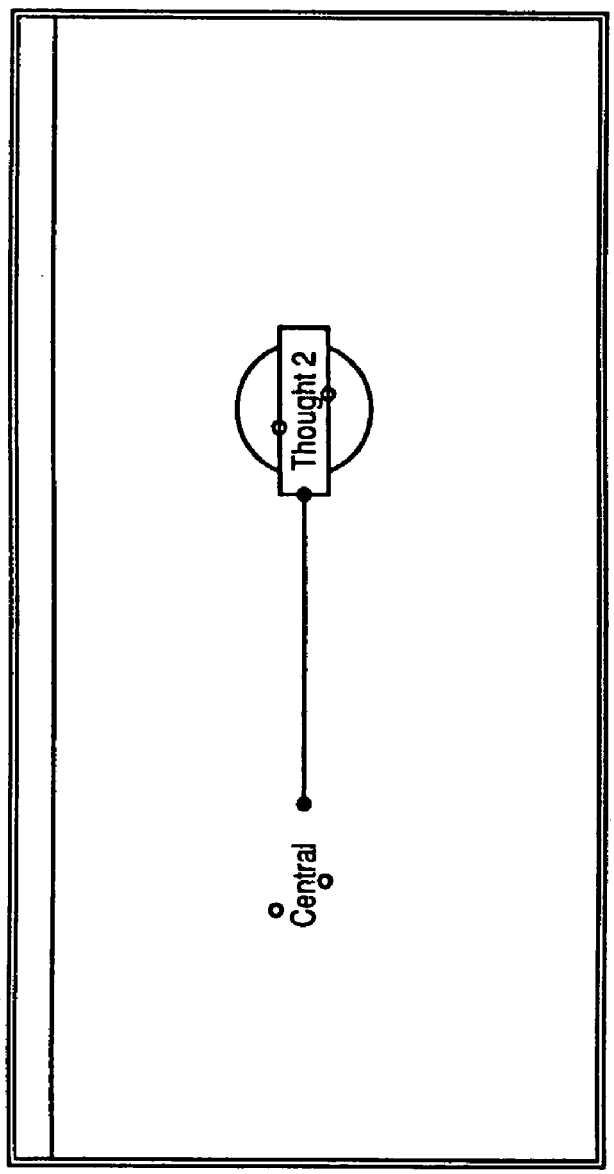
FIG. 20 illustrates the screen display that would result upon the selection of an element from the hypothetical screen display of FIG. 19.

These advantages become particularly clear when the interface and storage structure of the present invention are contrasted against a system having nondifferentiated links. A hypothetical screen display of such a system is shown in FIG. 19. This display is one possible representation of a central thought related to eight other thoughts. However, no information about the nature of this interrelation may be gleaned by the graphical representation of FIG. 19. The inherent limitations of systems capable of only a single type of association are strikingly apparent when one considers the plex that would result upon the selection of one of the thoughts depicted in FIG. 19. As FIG. 20 illustrates, the plex resulting from the selection of a thought from the hypothetical plex of FIG. 19 would contain only two individual thoughts connected by a single non-differentiated link. The present invention overcomes these deficiencies and allows an optimally flexible, intuitive, and therefore efficient means for organizing information.

Defining a Matrix

Figure 5:
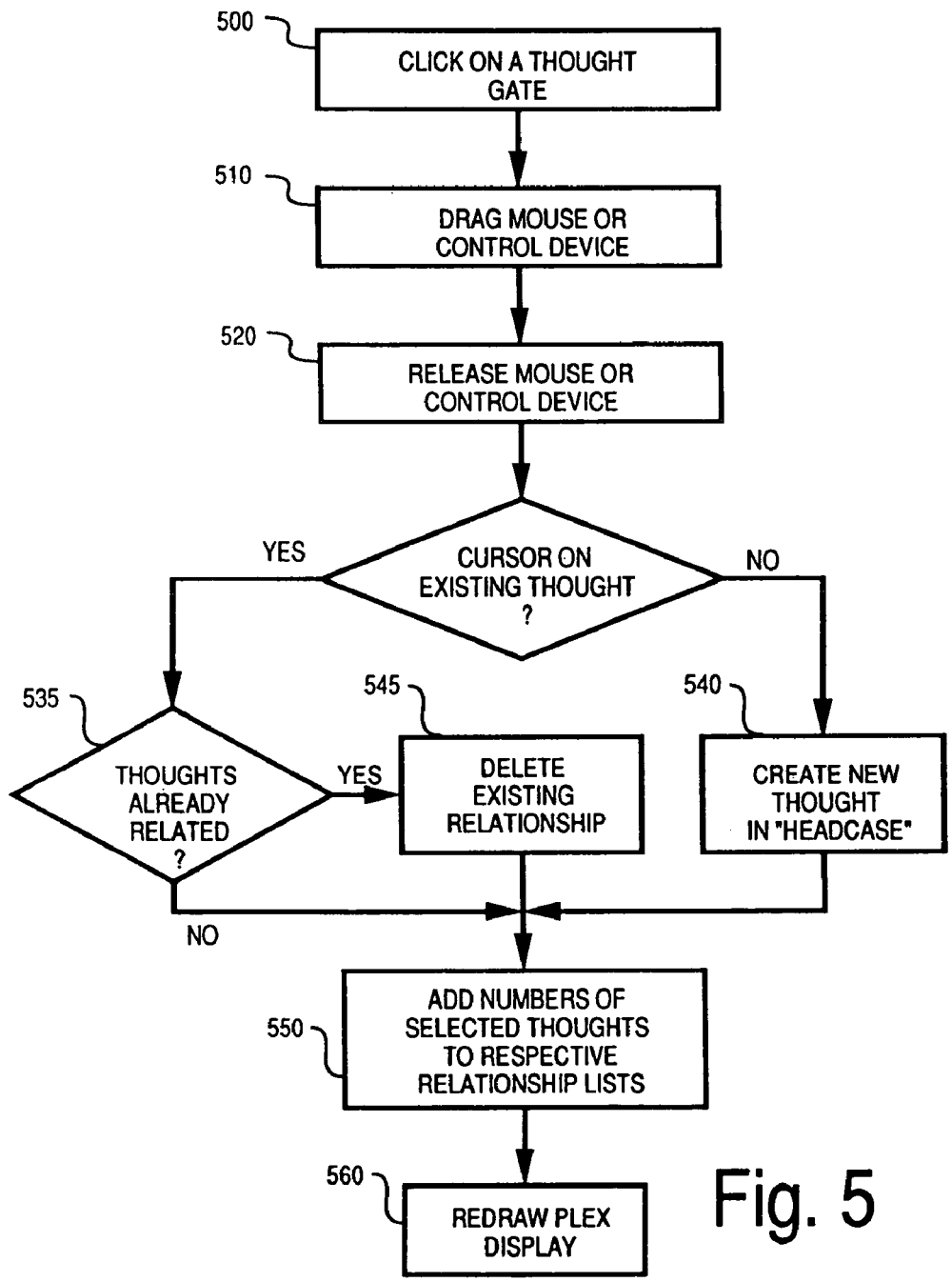
FIG. 5 is a flow diagram showing the process for creating and relating thoughts in an embodiment of the present invention.
Figure 7:
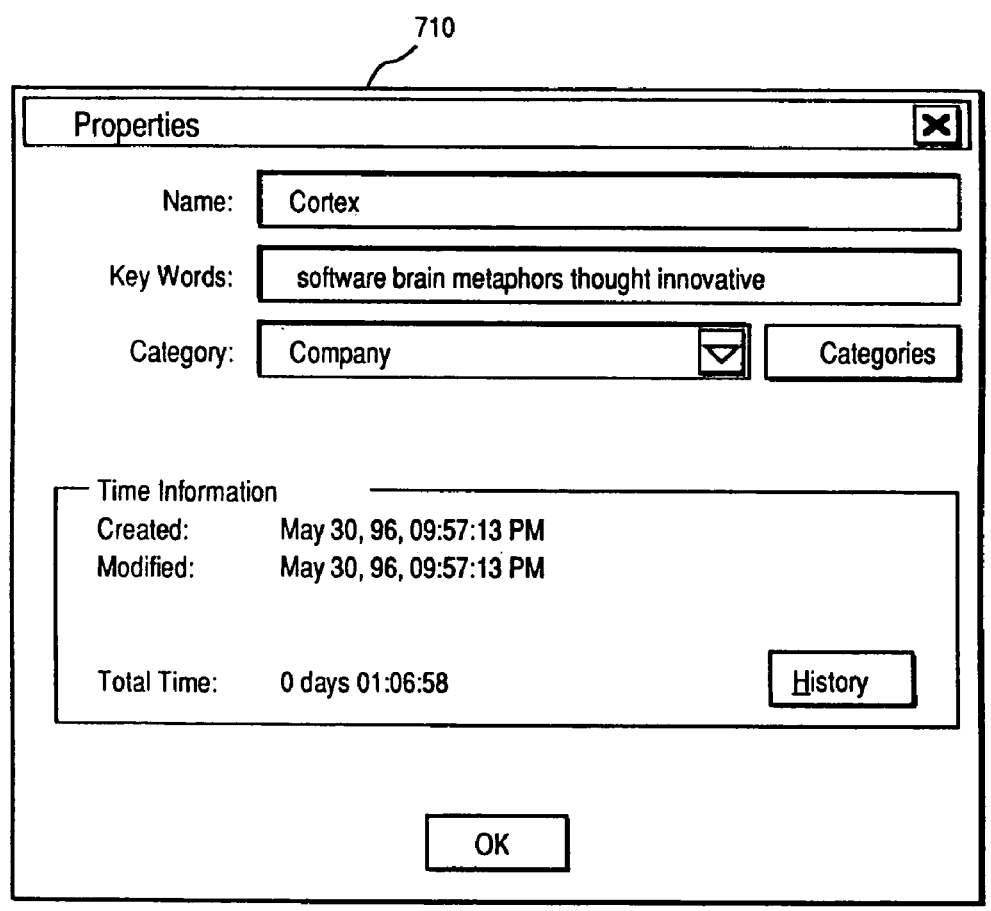
FIG. 7 illustrates a graphical user interface screen display, in accordance with another aspect of the present invention.

Creating New Thoughts. New thoughts may be created by interactively clicking and dragging, using mouse/control device 160, from any of the gates around an existing thought. FIG. 5 provides a flow diagram showing the basic steps of this process. At step 500, the user selects by clicking on a gate of an existing thought (a "source thought"), to which the new thought is to be related. At step 510, the user drags control device 160 away from the source thought; during this step, a "rubber-band" line may be displayed coming out of the source thought gate and tracking the cursor controlled by mouse/control device 160. At step 520, the mouse/control device's 160 button is released. At that point, if the cursor controlled by mouse/control device 160 is located over an existing thought (a "target thought"), as indicated at decision point 530, then the system assumes the user desires to create a new relationship between the source thought and the target thought, as will be described shortly below. In order to create a new thought, the user simply releases mouse/control device 160 with the cursor at an unoccupied location on the screen. In that case, as shown at step 540, a new thought is created and added to headcase 290. In one embodiment, a dialog box 710 (see FIG. 7) appears and asks for the new thought's name and/or other properties; a unique new thought number is created to refer to this thought; all of the new thought's data fields are initialized to default values; and the thought's number is added to a global list of all thoughts. At this time a user may specify a plurality of thoughts to be linked in the same manner. The present invention can automatically link pre-existing thoughts specified at this time.

Next, at step 550, a relationship is created between the source thought and the new thought, based in some embodiments upon the type of gate of the source thought that was selected at step 500. In particular, the new thought's number is added to the appropriate relationship list (245) of the source thought, and the source thought's number is added to the appropriate relationship list (245) of the new thought. Finally, at step 560, the updated plex is redrawn, reflecting the newly created thought and its relationship to the source thought.

Relating Existing Thoughts. Existing thoughts may be related using the same method as is used to create new thoughts. Referring again to FIG. 5, steps 500 through 520 are the same. However, at decision point 530, control device 160 is determined to have been released with the cursor located over an existing thought (the "target thought"). In that case, at step 535, the relationship list 245 (FIG. 2) of the source thought and target thought are checked to ensure that the thoughts are not already directly related. If such a relationship does exist, it may be deleted at step 545 by removing the source and target thoughts' numbers from each other's current relationship lists, to avoid any ambiguities. Next, at step 550, the source and target thoughts' numbers are added to each other's appropriate relationship list (245), as determined by the source thought's gate type originally selected at step 500. The redefined matrix is redrawn at step 560. If such a relationship does not exist, then step 545 is inapplicable and step 550 is processed immediately after step 535 is executed.

Figure 8:
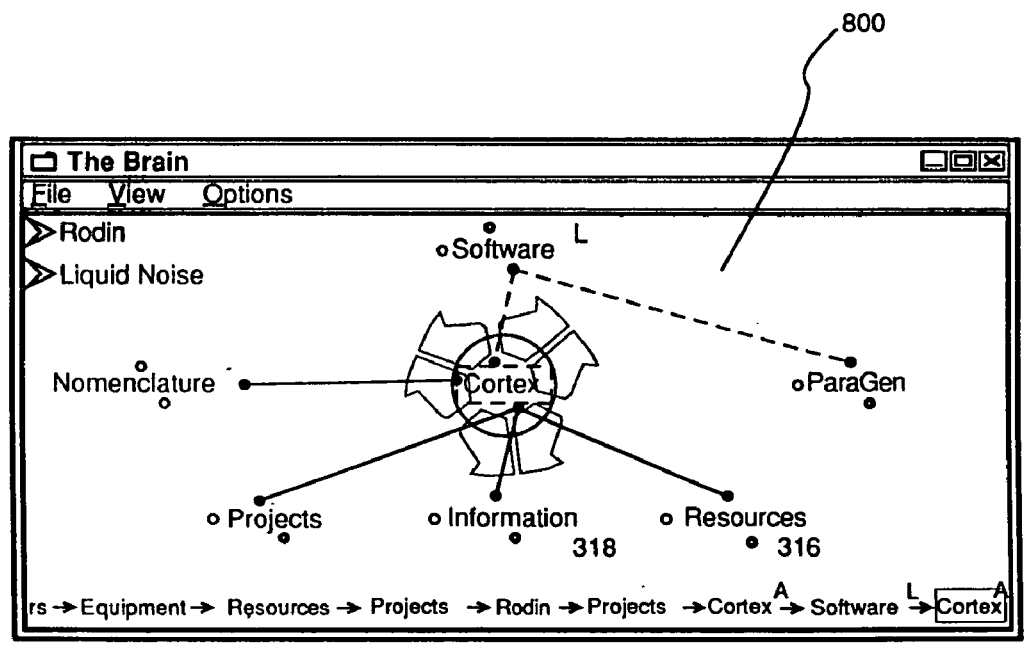
FIG. 8 illustrates a graphical user interface screen display, in accordance with another aspect of the present invention.

Reordering Relations. Related thoughts are drawn in the plex according to the order they are listed in the relationships list of the central thought. By dragging the thoughts in the display, the user can specify in what order they should be listed and as a result, where they will appear. In reference to FIG. 3, FIG. 8 provides an example of the display 800, in one embodiment, which would result if a user were to interactively reverse the order of thoughts 316 and 318, causing the icons representing those thoughts 316 and 318 to switch horizontal positions as demonstrated by the positions of those thoughts 316 and 318 in FIG. 8 or if a digital computer were to reorder those thoughts based upon an alphanumeric sequence, usage statistics, or other logical criteria.

Figure 6:
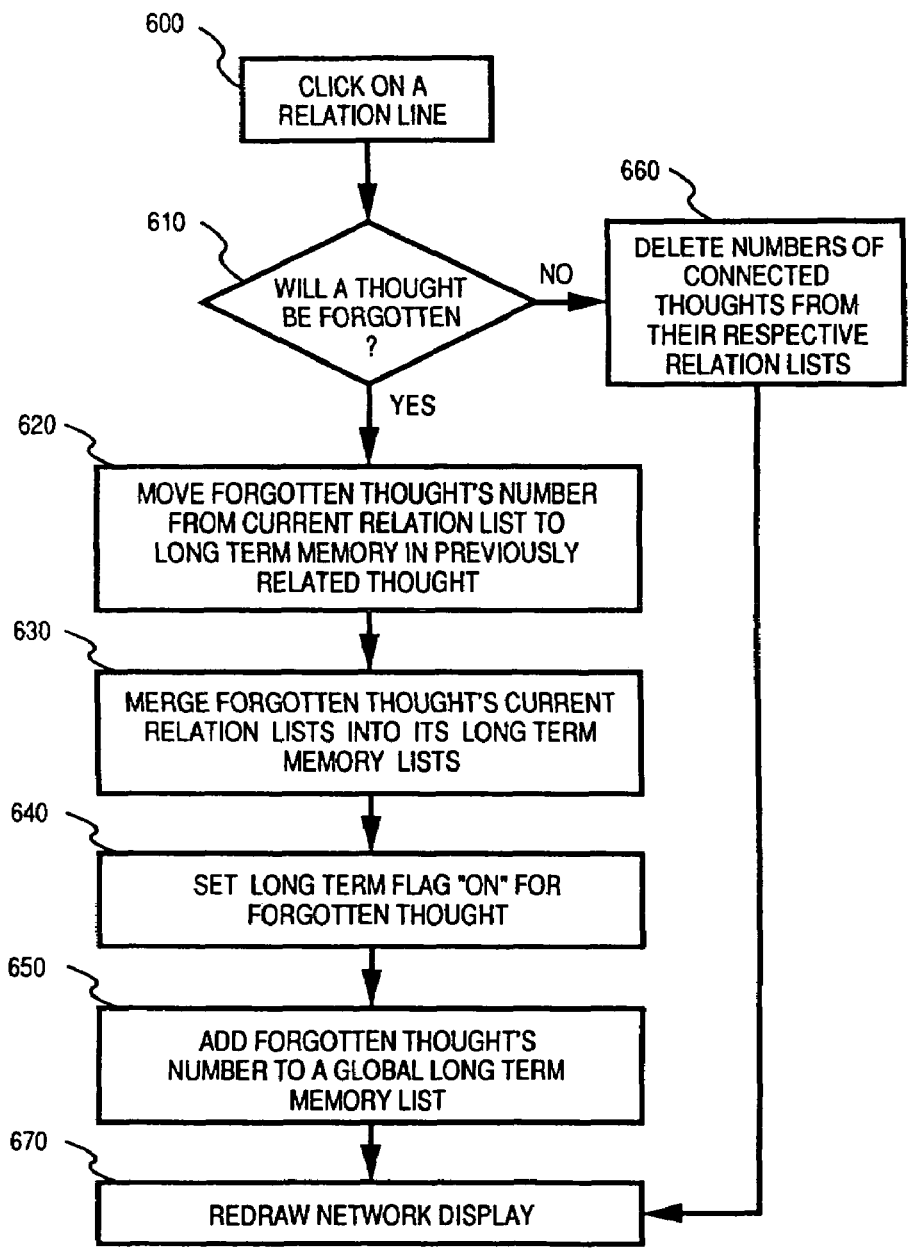
FIG. 6 is a flow diagram showing the process for severing relationships between thoughts in an embodiment of the present invention.

Severing Relations Between Existing Thoughts. It is possible to sever the relationship between two existing thoughts, such as central thought 310 ("Natrificial") and child thought 314 ("Projects"), using a process similar to the process used to define a new relationship between existing thoughts. As the flow diagram in FIG. 6 outlines, at step 600, the user requests that a particular relationship be severed by clicking on the lines which connect two thoughts such as the line connecting thoughts 310 and 314 in FIG. 3. Next, at decision point 610, a check is made to see if the requested severing would involve the special case of "forgetting," as will be explained shortly. If no "forgetting" will occur, then at step 660 the numbers of the two thoughts are removed from each other's relationship lists and the line between thoughts 310 and 314 in the graphical display shown in FIG. 3 may be removed.

The special case of "forgetting" an existing relationship will now be explained. Consider the example plex shown in FIG. 3. If the relation between thought 314 ("Projects") and central thought 310 ("Natrificial") is severed, then there will be no path at all connecting thought 314 with central thought 310, and thus no way to access thought 314 from the current thought. Thought 314 will be isolated. In that sense, thought 314 will be "forgotten" if the severing is performed. Therefore, in the process depicted by FIG. 6, decision point 610 detects such cases (see below, "Determining if thoughts will be isolated"). In such cases, the number of the "forgotten" thought (i.e., thought 314) is deleted from the current relationship list 245 (FIG. 2) of central thought 310 at step 620, and is added to the corresponding past relationship list 250 of central thought 310. Recall that the past relation lists 250 are included as part of each thought's data structure, as illustrated in FIG. 2. Next, the forgotten thought's own fields are revised to reflect its status as a "forgotten" thought: namely, at step 630, thought 314's current relationship lists 245 are merged into its past relations lists 250 (i.e., copied from 245 to 250 and then erased from 245), and at step 640 its "long term memory" flag is set to "on." At step 650, forgotten thought 314 may be added to a global long term memory thought list. At step 670, the plex is redrawn, reflecting the absence of forgotten thought 314. It is possible to forget more than one thought at once, in which case all of the forgotten thoughts will be modified as described for thought 314.

By reference to particular usage statistics, the forgetting operation may be automated. More precisely, the present invention may automatically forget a thought that has not been accessed within some user-definable period of time, as reflected by the usage statistics associated with that thought.

Determining If Thoughts Will Be Isolated. A thought will be isolated when it is not possible to return to the central thought via any link other than that link which is being severed. Similarly, any thoughts ("Rodin" 950 and "Liquid Noise" 960 in FIG. 9) related to the severed thought ("Projects" 314) will be forgotten so long as their only link to the central thought existed via the severed thought ("Projects" 314). One method of determining whether it is possible to return to the central thought from a thought whose link has been severed is illustrated by the recursive algorithm disclosed in FIG. 10.

An alternative method that may provide enhanced performance is disclosed in FIG. 24. This method relies on a programming object termed a ThoughtList, which utilizes a map of bits representing thought numbers. Each bit in the map corresponds to a thought, with a (1) indicating a thought on the list and a (0) indicating a thought not on the list. In accordance with this methodology, one can store the existence or nonexistence of over a million thoughts using merely 128 kilobytes of storage. The storage required for this technique is determined by the highest possible thought number divided by eight. All memory or storage used for this list is zeroed out, and is subsequently modified (to 1's) at locations corresponding to thoughts. Specifically, when a thought is added to the list, the bit number X of byte number Y is set, where X is the remainder of the thought number divided by eight, and Y is the thought number divided by eight. This method may also be used for storing normal thought lists.

Parentless Thoughts. An alternative embodiment of the present invention maintains a list of parentless thoughts (thoughts without parents) that is updated whenever changes are made. When a thought is created, linked, or unlinked, the affected thoughts are checked for parents. If these thoughts have parents, they are removed from the list; otherwise, they are added to the list. If necessary, the list of parentless thoughts may easily be regenerated by checking all thoughts for parents. Because this list is maintained, it is not necessary to ensure that all thoughts are connected. Thoughts may therefore be unlinked without verifying the existence of alternative return routes to the original thought.

Forgetting and Remembering Without Searching. When thoughts are unlinked without searching, it becomes necessary to have an alternative interface for forgetting. Among the possible methods for accomplishing this result are dragging the thought to a forget icon or selecting a command. The thought will then be forgotten along with all of its childward descendants that do not have other partners and are not the active thought. To decide which thought to forget, the present invention makes a list that includes the thought to be forgotten and all thoughts childward of it. The present invention does not add the active thought to this list. To remember the thoughts, the user can drag a thought to a remember icon or select a command. The thought and all its forgotten childward descendants will thereby be remembered. More detailed algorithms for implementing these forgetting and remembering operations are set forth in FIG. 17.

Figure 11:
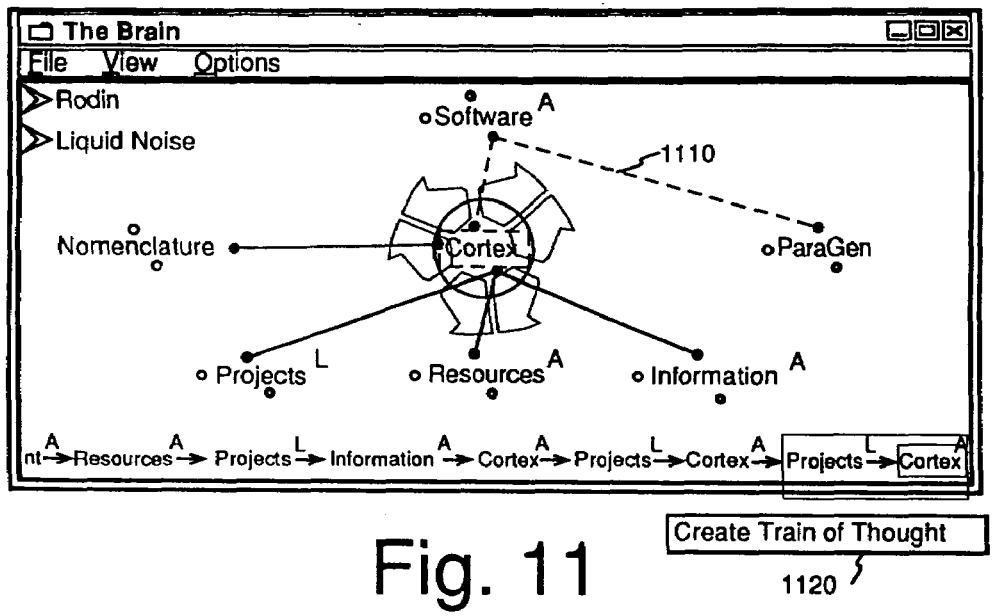
FIG. 11 illustrates a graphical user interface screen display, in accordance with another aspect of the present invention.
Figure 12:
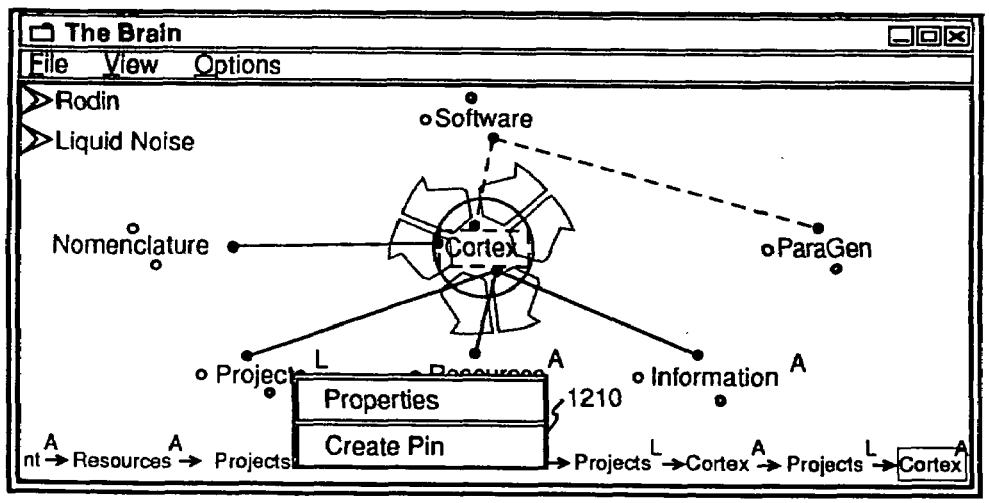
FIG. 12 illustrates a graphical user interface screen display, in accordance with another aspect of the present invention.

Accessing Long Term Memory. To access thoughts that are stored in long term memory, in some embodiments the user can interactively activate the display of long term memory relationships (for example, by means of a menu selection or function key). The display will then be refreshed, and thoughts related by long term memory relationships will become visible and are connected (as shown in FIG. 11) to the central thought with a line, such as line 1110, of a different sort than that used for normal relationships. A long term relationship can then be recreated as a current relationship by using the "Relating Existing Thoughts" technique described above. In that case, the appropriate thought numbers (see FIG. 2) are copied from past relationship lists 250 to the appropriate, current relationship lists 245. The appropriate thought numbers are then moved in the global long term and short term memory lists, and the display is once again redrawn.

In an alternative embodiment of the present invention, each thought's headcase does not include a list of past relationships. Rather, each thought's headcase merely contains a flag identifying it as a forgotten thought or a present thought. When a user interactively turns on a display of long term memory within this alternative embodiment, forgotten thoughts and their relationships to present thoughts are added to the display, and severed relationships between present thoughts will not reappear. This alternative embodiment may offer certain advantages, including without limitation (i) presenting the user with a simpler, more readily comprehensible set of information regarding past relationships within the matrix; and (ii) reducing the complexity of the matrix's data structure and hence the computing resources used to operate the matrix.

These same principles used for implementing long and short term memories are equally applicable for creating many other classes or levels of memory. A plurality of memory levels may be created and thereafter any or all of the relationships stored at each level or in each class may be selectively chosen for viewing. For example, a user may elect to display only the top level, all levels, up to a specified level, or particularly designated levels having no immediate connection.

Permanently Deleting a Thought. It is also possible to permanently remove a thought from the matrix. This is accomplished by clicking on a line (such as line 1110) which connects a thought which is already in long term memory. When severing a relationship in this manner results in a thought or thoughts becoming isolated, this thought or thoughts are removed from the global thought list and from the past relationships list 250 of the central thought. Although a portion of the thought data relating to a deleted thought will be erased, in one embodiment of the invention, the space occupied by the thought in the flat file database will be retained so that the software does not have to remove all references to it. The present invention may be unable to remove all such references because they may occur on other lists or in other matrices which the software cannot control. Furthermore, comprehensive elimination of references may be computationally prohibitive, and leaving the thought's space in the flat file database requires relatively little storage space.

Dividing a Matrix. When a user selects a link that will result in the isolation of particular thoughts, the user may optionally forget the thoughts, permanently forget the thoughts, or split the matrix into two parts. Splitting the matrix into two parts will create a new thought that has the same name as the first thought to be isolated, but the document associated with this newly created thought will be a new matrix that is named after this first thought to be isolated. This new matrix will consist of all the thoughts which will be isolated in addition to the thought located at the position of the last link to be selected. That thought will reference the original matrix, and will be named after the original matrix.

Creating New Thought Flags and Types. To define a new thought flag, the user interactively selects a thought and then enters a flag name and its default state. To define a new thought type, the user enters the name of the new type, its default flag states, and any fields that the type has. The new types and flags can thereafter be referenced by the user when creating new thoughts or changing thought properties. The type of a thought dictates which application program is used to edit the information associated with that thought. Application programs may be directly associated with a thought in the same way that the document window 360 in which a thought may be edited is associated with active thought 330. One embodiment of the invention assigns a preferred thought type to thoughts, but the user can override this thought type assignment by selecting another thought type either at the time of creation or by changing the default thought type in the preferences. Acceptable thought types include any computer application capable of communicating with the present invention employing the methods disclosed herein. In some embodiments, the correct thought type for a document is determined by the file extension that the location specifies.

Figure 13:
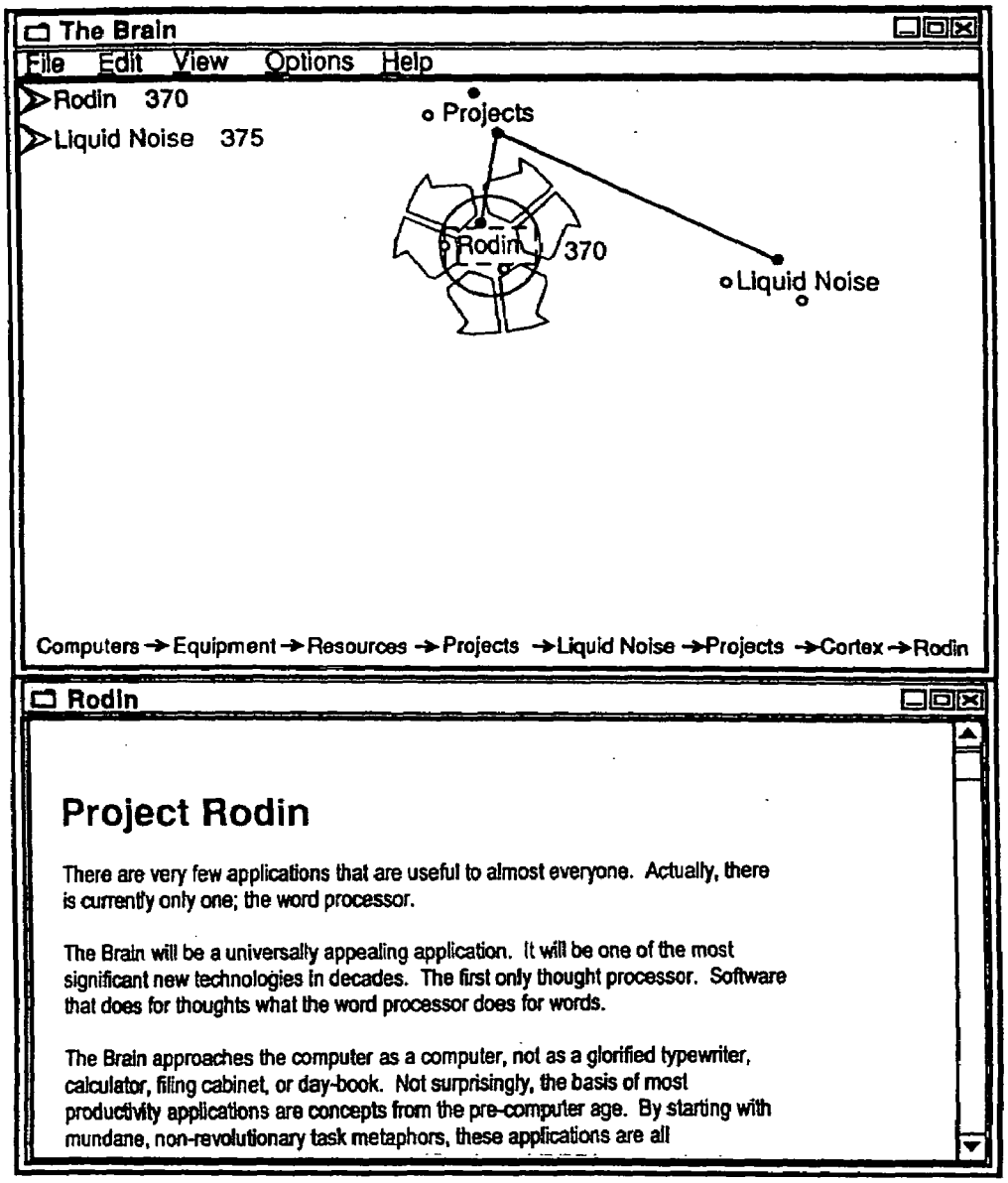
FIG. 13 illustrates a graphical user interface screen display, in accordance with another aspect of the present invention.

Thought Pins. Thought pins are used to get instant access to commonly used thoughts. In the upper left corner of FIG. 3 are two thought pins 370 and 375, labelled "Rodin" and "Liquid Noise." Thought pins can be moved by the user to any location or deleted. To create a new thought pin, the user simply moves the cursor (using mouse/control device 160), and clicks on or otherwise highlights the existing thought for which a thought pin is to be created, and then selects a "Create Pin" command or the like from an ensuing pop-up command menu (such as menu 1210). Alternatively, pins may be created by dragging thoughts to predefined zones within the display. Selecting an existing thought pin (e.g., using mouse/control device 160 to position the cursor over the pin, then clicking the control devices's button) makes the pin-represented thought into the new central thought of the current plex. For example, selecting thought pin 370 ("Rodin") in FIG. 3 would result in the plex transforming into the plex displayed in FIG. 13, with thought 370 ("Rodin") as the central thought. Note that thought pins may be represented internally by the number(s) of the thought(s) they reference and an explicit, user-specified display location.

Messaging System. An embodiment of the present invention utilizes a thought messaging system ("TMS") to enhance interoperability between the present invention and the applications used to create, edit, and display documents; this messaging system plays a central role in matrix creation, as discussed below. Applications that comply with the TMS are referred to as "TMS-enabled" applications. Some embodiments of the present invention only interoperate with TMS-enabled applications. Other embodiments take advantage of the program-to-program interface features of operating systems such as Windows® by Microsoft to enable any application to be launched and operated within documents associated with thoughts, without need for a specialized TMS. Whether or to what extent a TMS is necessary to enable TMS-application interoperability depends partly upon the capabilities of the underlying operating system. A Windows® embodiment of the present invention, for example, allows the user to specify a list of Windows® applications which will create, read and write to files corresponding to thoughts of a certain "type."

For instance, a spreadsheet application such as Microsoft Excel® would enable the creation of Excel-type thoughts which, when activated by the user, launch Excel, and load the Excel document associated with the specified thought. Further, in one embodiment of the present invention, the display icons corresponding to thoughts are specialized according to thought type. For example, a thought of the Excel type would be symbolized by a display icon graphically depicting the thought as such an Excel type. A TMS may not be required under Windows® to enable the limited interoperability described in this paragraph. Methods of processing thoughts are described in greater detail below.

Even in Windows®, however, the incorporation of a TMS enables improved interoperability between the present invention and TMS-enabled application programs. TMS-enabled applications permit users to link thought directly to objects within TMS-enabled application documents by dragging to the document windows. With applications that incorporate hyperlinks, the TMS allows the user to drag thoughts directly to those hyperlinks and associate with the objects that they reference. The TMS can be configured to work in concert with messaging systems native to the operating system. For example, Microsoft Windows® uses Dynamic Date Embedding ("DDE").

Using the program-to-program messaging capabilities of known operating systems, the TMS permits the present invention to provide specific instructions to TMS-enabled applications. For instance, the TMS may include the following core messages from the software of the present invention to the application. Software of the present invention may request the identity of the document over which the mouse pointer presently resides; the application would respond with the current document name and file location using the name and address symbol of the native operating system, or the hyperlink's name and file location. The present invention may signal the activation of a particular thought, and the present invention will provide the number, name, and location of this thought; if a thought is being created, the present invention will also provide the template parameter(s) corresponding to this new thought; in response, the application will save the current document and load or create the new document if the new document is of the same type, and if creating the new document, will use the template parameter to open the default document. The present invention may request that the application move its window to the top; in response, the application will make its window visible over any other applications. Finally, the present invention may request that the application move its window in a requested manner, save, rename, or relocate its document; in response, the application will do so, as instructed by the software of the present invention.

The TMS may also include by way of example the following core messages from applications to the software of the present invention. An application may ask the present invention to identify the active thought; the present invention will respond with the active thought's number, name, and location using TMS-specific symbols. An application may ask the software of the present invention to activate a thought with a specified number, name, and location, and the present invention will do so. An application may ask what thought corresponds to a particular number, name, and location; the software of the present invention responds with the thought's number, name, and location, or will return "false" if the specified thought does not exist. An application may ask the software of the present invention to create or link a specified thought, related by designated child/parent links to another designated thought; if requested, the software of the present invention performs the specified operation. Finally, an application may tell the present invention that the application is TMS-enabled, and will provide the information needed to start the application, the application's document types, and their respective descriptions; if so, the present invention stores this information and adds that application's document types to the list of permissible thought types.

Automatic Thought Recognition. The present invention can activate thoughts based on commands sent from other application programs as well, including without limitation, the editor or calendar applications. For instance, the editor may contain a word that is also a thought name. Using the TMS, the editor can identify the specific word or words as being a thought and automatically highlight them on the display. Alternatively, the present invention could be queried when the user selects one of these words. When a word is successfully identified as being a thought and is selected by the user, the application may then send a message to the present invention requesting the activation of the specific thought. A similar process may be used to recognize and activate thoughts through any TMS-enabled application.

Creating Thought Plexes. As described earlier, thought plexes are the graphical displays of a group of related thoughts, consisting of a central thought and any parent, child, jump, and sibling thoughts. There is always at least one thought plex. In one embodiment of the present invention, additional thought plexes can be created by using the control device 160 to position the cursor over any thought other than the central thought, and dragging the selected thought to the desired location of the new plex. Each time a user creates a plex, that plex is added to the screen display along with the other plexes previously presented on the screen display (see FIG. 9).

Figure 9:
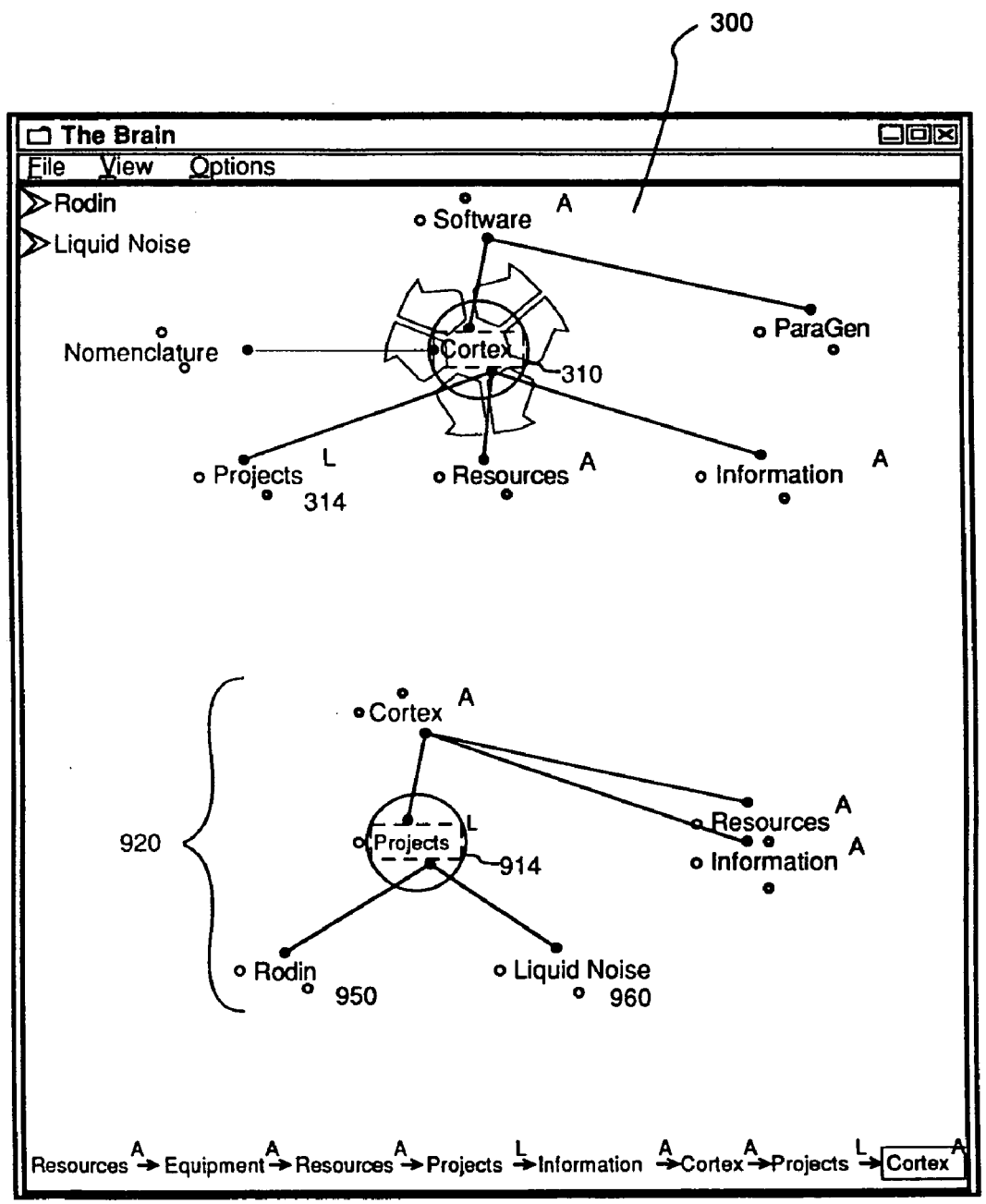
FIG. 9 illustrates a graphical user interface screen display, in accordance with another aspect of the present invention.

The figures demonstrate an example of the manner in which a new plex may be created. First, in FIG. 3, a user interactively selects the thought 314 ("Projects") to be a new central thought by using control device 160 to position the cursor over that thought, then selects the thought by clicking and holding a button on the cursor control device. The user then employs control device 160 to move the cursor to the desired location of the new plex and releases the button. FIG. 9 demonstrates the screen display which results. Plex 920 has been added to the screen display, with the thought 914 ("Projects") as the central thought of new Plex 920. The Plex is the on-screen interface to the matrix in which data is stored.

Automated Matrix Creation. Matrices may be created either on command or, in one embodiment of the present invention, they may be created on the fly. When created on command, matrices are static and will not change unless a user explicitly commands that a change be made. When created on the fly in response to user inputs and navigation, by contrast, a matrix will change as the information represented by that matrix changes.

Automated matrix creation has many potential applications, including the automatic creation of a matrix representing a standard hierarchy such as those commonly used in directory structures. In this application, the software of the present invention begins at the root of the hierarchy and creates a child thought for every file and folder, and then goes into each folder and repeats the process. This recursive process effectively generates a plex representing a directory structure, and as discussed above, can be performed on the fly or as the user navigates amongst thoughts. The present invention begins by displaying the current thought within the hierarchy. Each item within the presently displayed thought is displayed as a child, and children that contain other items are displayed with a highlighted child gate to indicate the same to the user. The level of the hierarchy that contains the current item is displayed as a parent, and the other items within the level containing the current item are displayed as siblings.

The automated conversion of a standard hierarchy to a matrix within the present invention allows users to subsequently modify the resulting matrix in a nonlinear nonhierarchical manner, thereby creating a nonlinear nonhierarchical information structure with a minimum of effort. Furthermore, the ability to view and activate siblings may be valuable irrespective of whether nonhierarchical relationships are established within the matrix.

The present invention additionally may automatically generate matrices reflecting self-referencing hierarchies, such as those used to organize the World Wide Web ("WWW"). When an item in a self-referencing hierarchy is encountered and has already been added to the matrix, the present invention links to the existing thought rather than creating a new thought. This technique may result in "wrap around" structures and multiple-parent structures that actually exist in a self-referencing hierarchy and can now be displayed with the advent of the present invention.

Similarly, the present invention permits a matrix to be automatically generated from a hypertext document. This document becomes the central thought, and the linked items within the document become children thoughts. Those linked children may subsequently be explored in a similar manner. In cases where hypertext uses somewhat predictable link names, the present invention may link thoughts in a more context-sensitive manner. For instance, files located on a remote computer or Internet URL may be displayed as jump thoughts, and files which are disposed in a hierarchical directory location above the current directory may be displayed as parent thoughts. This method for automated generation of matrices may be restricted so that it does not create overly cumbersome plexes. For example, it may be designed so that it does not create thoughts relating to files located on remote machines.

A matrix may also be created on the fly to reflect a user's navigation within a collection of hypertext content such as the Internet's World Wide Web. In this embodiment, each hyperlinked document selected by the user is linked as a child to the document from which it was selected, and the hyperlinked document becomes the active thought. Once such a structure has been created, the "back" command may be used to activate the parent thought, thereby moving the user to the previous page. Similarly, the child thought is activated if the user selects the "Forward" command. The added benefit to using this matrix arises in cases where the user selects a different hyperlink rather than the "Forward" command; in such cases, the new hyperlink is added as a child thought. Also, if a user navigates to a page which has already been visited, there will already be a thought representing that page which will be linked to as a child. In this fashion, users may generate a matrix that is exceptionally useful for tracking browsing history relative to traditional methods.

Furthermore, matrices representing the results of a database search may also be generated. Such searches are typically performed in response to words input by the user, and the results are usually displayed in an ordered list arranged by some measure of frequency or relevance. One embodiment of the present invention parses such lists to identify other common words or themes from among the results. In accordance with the result of this parsing step, a matrix is created with the query as the central thought and with the other common words or themes as child thoughts. Results that do not share common words or themes are displayed as children. When a child thought is activated, if the child has a common word or theme, the results sharing that commonality are broken down again. If the child is a result, then results that are contained within that result are displayed as children, and items related to that result are displayed as jumps.

Moving Thought Pins and Plexes. In one embodiment of the invention, thought pins can be repositioned by dragging them with the mouse or other control device. Thought plexes can be repositioned by dragging their central thought with the mouse or other control device. Thought pins and plexes can be deleted by dragging them off of the display. Eliminating a plex from the display does not result in any thoughts being forgotten. Forgetting involves a different user-interactive process discussed above (see "Severing Relations Between Existing Thoughts").

Resizing a Thought Plex. In one embodiment, a thought plex can be sized by dragging the circle which surrounds the central thought. Making the circle bigger makes the entire plex bigger and vice-versa.

Changing a Thought Pin. In one embodiment of the present invention, a thought pin can be made to reference a different thought simply by dragging the desired thought onto the pin.

The Matrix Freeze. In response to a user's request or in response to a regularly scheduled system request for backup, a "Freeze," in one embodiment, saves the state of all parts of a matrix at a given point in time, copying all the information to a read-only format for later use.

Processing Thoughts

Naming Thought Files. By default, a thought does not have a matrix or operating system file location specified when it is created. If the user selects an active thought without a specified location, a Windows® embodiment of the present invention's software opens a dialog that allows the user to select the type of file to create. After the user selects a file type, that embodiment of the present invention uses standard operating system methods to create a file of the selected type and thereafter names the file by appending the file type to the name of the thought. The file associated with that thought is placed in a folder (_brn folder) specified by the present invention (discussed below) and is opened immediately. The file name and the thought name are independent, and the renaming of a thought does not compel the renaming or relocating of its file within the network or operating system. Therefore, if the file is shared, other programs and users not operating the present invention will still be able to locate it.

Opening a Thought. A thought's headcase file may specify an item (a thought document) within a traditional file system that is associated with the thought. This thought document may reside in the storage system of a local computer, or may be retrieved through a network, including without limitation a LAN or the Internet. When a thought is activated, the present invention may request that the operating system open the thought document associated with the selected thought. When a thought document is saved, it will typically be stored by most application programs to the file location from which it was loaded. This location is, of course, the location that the thought references. Accordingly, a user may both open and close files from the present invention without navigating a traditional operating system's file reference means, and irrespective of the storage location of that file.

A user may optionally limit automatic thought document loading to those documents having specified file types or residing in certain locations. File extensions typically may be used to distinguish among file type. For example, file location, usually placed before the filename and separated from the filename by a backslash, allows a Windows® embodiment of the invention to discern the location of each file; periods and forward slashes allow a UNIX or Internet embodiment the same utility.

Editing Thought Documents. Each thought's document contents are displayed in document window 360, as illustrated in FIG. 3. When the current thought is changed, the last thought's document is saved (unless otherwise directed by the user) if necessary and then the new current thought's document is loaded automatically. The user never has to issue "save" or "open" commands to access thought documents, nor does the user need to explicitly identify or invoke an editor or other application program to process the thoughts. These operations are performed automatically by the present invention, seamlessly and transparently. When a thought is activated by the user, the present invention saves the previously active thought, if it has changed, then loads the newly active thought. Well-known computer programming object technologies, including without limitation Microsoft's Object Linking and Embedding ("OLE"), allow the document to make references to data which is created and edited by other programs. Using standard operating systems calls, the present invention can display and allow the user to edit these objects with the appropriate computer programs. In addition, the document may also store references to the location of other documents on the storage systems available to the computer, allowing the user to open them with the appropriate computer programs using a more traditional operating system method.

Linking to Remote Files. Using the TMS or another method of inter-process communication, the present invention can request an application to identify the file it presently has open. The availability of this technique allows the present invention to create thoughts representing files that are open in other application programs. In one embodiment, the user may do so by simply dragging a link from a thought and releasing the selection button on the cursor control device when the pointer is situated over the desired application window. Upon the performance of these steps, the present invention queries the application for the identity of the file it has loaded, and the present invention creates a thought and sets the name and location of this thought in accordance with the application's response to the present invention's query. The thought (in this case, the active document in the application window) is thereby linked to the gate from which the user dragged the cursor. For instance, if the document is a Hypertext Markup Language ("html") World Wide Web site stored remotely on the Internet being viewed using a web browser application such as Navigator® by Netscape, the present invention will name a new thought based upon the document's Internet URL (Uniform Resource Locator) or the contents of an html "title" tag. When, in later use, a user reactivates this thought, practicing methods described above, the present invention will launch the user's preferred web browser application, and request that the web browser download the html file from the remote URL.

Figure 22:
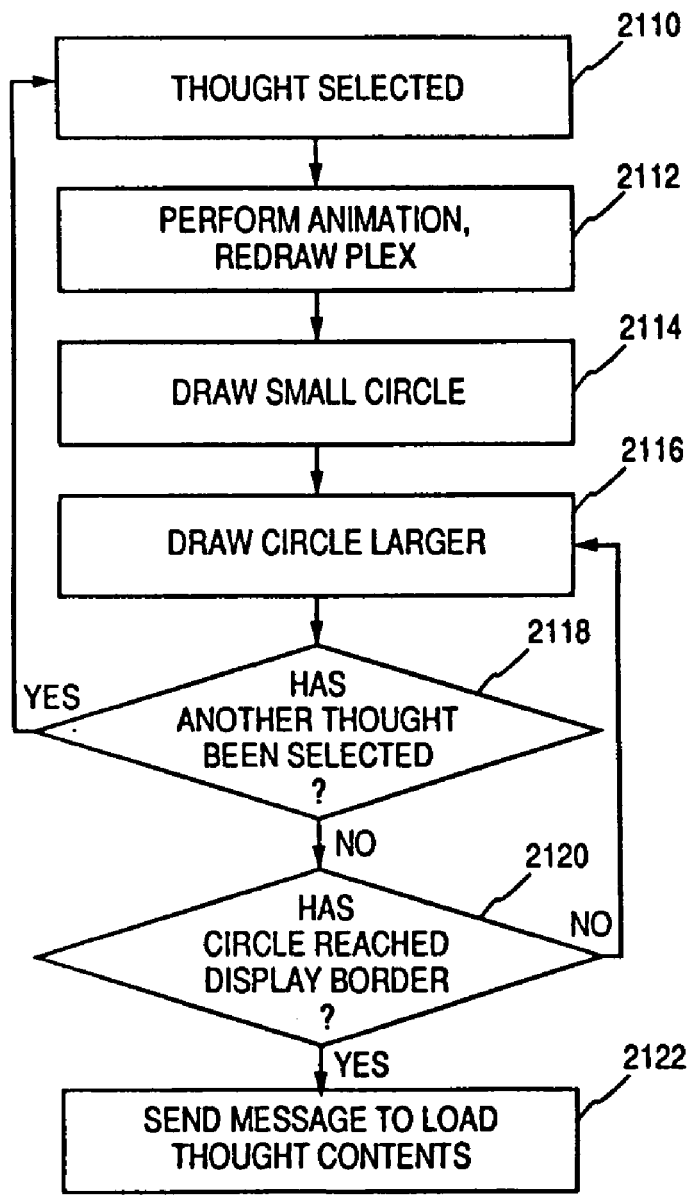
FIG. 22 illustrates a flow chart describing one method for implementing the delayed loading feature of one embodiment of the present invention.

Delayed Loading. In some instances, the loading of the contents of a thought may require the expenditure of considerable computing resources, and it may be desirable to allow the user to navigate through a series of thoughts without loading the content of every thought through which a user passes along the path to reaching a particular destination thought. This functionality is implemented in accordance with the flow chart illustrated in FIG. 22, and allows the passage of a duration of time noticeable to the user before loading the contents of a selected thought. More particularly, upon the selection of a thought by the user at step 2110, the plex is redrawn in step 2112 using the animation techniques discussed herein, and a loading delay procedure initiates. One embodiment of the present invention uses an expanding circle to appraise the user of the status of the loading delay. At step 2114, this expanding circle begins as a small circle oriented within or about the area representing the central thought, and the circle expands with the passage of time. At step 2116, the circle is enlarged and is redrawn. Next, at step 2118, the method queries whether another thought has been selected. If so, the routine returns to its beginning, step 2110, and the loading delay process is initiated with respect to the newly selected thought. If another thought has not yet been selected, in step 2120 the routine queries whether the circumference of the circle has grown to reach the periphery of the present invention's window in which the present plex is graphically displayed. If so, the routine generates and sends a message to load the contents of the selected thought in step 2122. If not, the routine returns to step 2116 where the circle is enlarged and redrawn, and the routine continues. With this method, thoughts are not loaded during a predetermined period of time after their selection, and are not loaded if another thought is selected during this time. This delayed loading may be used to allocate optimally the computing power available to a user.

Some prior Internet browsing means require every World Wide Web site to incorporate user navigation methods within hypertext documents. Those methods inefficiently force users to download irrelevant information, merely for the purpose of navigating through it. One strikingly powerful application of the present invention's delayed loading technique allows expedited navigation through Internet pages or files without waiting for the content of intermediate pages or files to load.

Changing Thought Properties. Thought properties such as name, flags, priority, and category can be changed using a thought properties dialog box, such as dialog box 710, which is accessed by the user employing mouse/control device 160 and/or keyboard 150 to select a particular thought and then the thought properties dialog box. In some embodiments, the properties dialog box remains visible at all times, and changes to reflect the properties of the current central thought.

Figure 14:
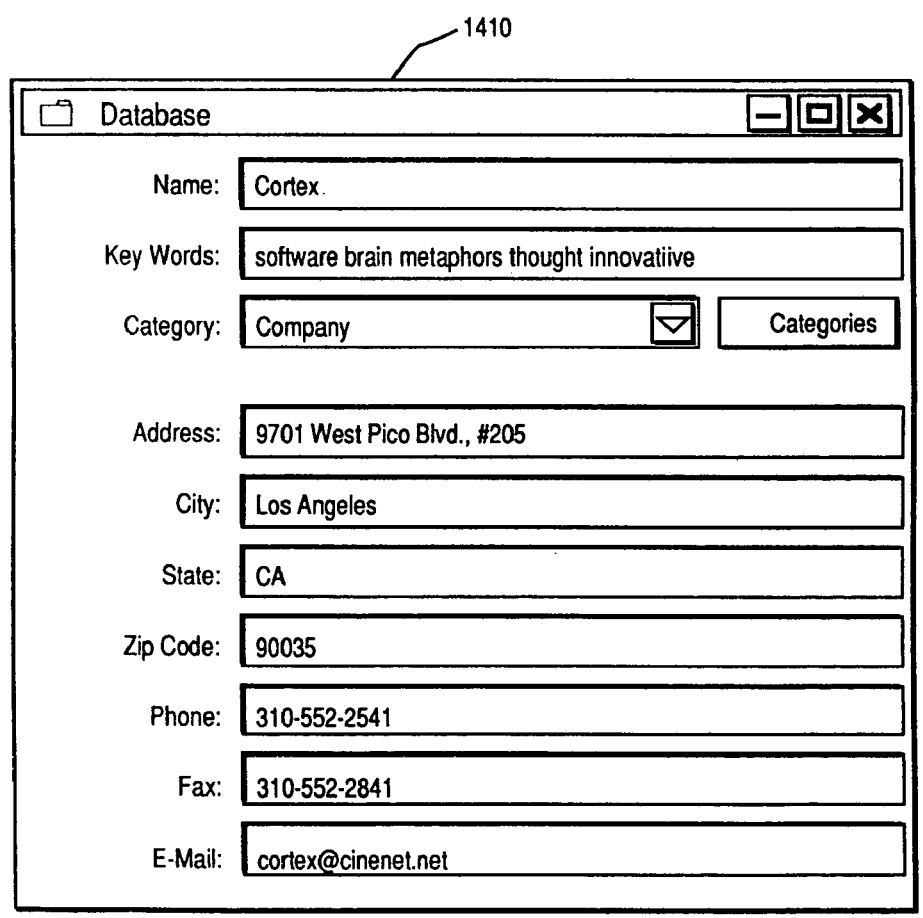
FIG. 14 illustrates one embodiment of a dialog window for editing thought fields.

Editing Thought Fields. Thought fields can be edited in a dialog box or window such as 1410 in FIG. 14. In one embodiment, the field names are displayed to the left and their contents to the right. Thought fields are automatically loaded and saved, in the same fashion as are the contents of thought documents, invisibly to the user every time a thought field is modified. All thoughts of a certain category possess the same available thought fields, which fields are defined by the user in establishing and modifying thought categories (see above, "Category").

In one embodiment, every thought category 240 possesses at least two fields. Those default fields are the "Name" field and the "Key Words" field. The contents of these default fields are identical to the contents of the properties called "Name" and "Key Words" respectively.

Rewinding and Replaying Previous Operations. An event list is created automatically by the present invention, as the user works. The event list is a recording of each action the user takes. It stores how to undo each action and how to repeat each action. At the user's request, the present invention can then use this information to "rewind" and "replay" the actions of the user.

Thought Lists. Internally, within a computer, the present invention stores thought lists as a list of thought numbers. To the user, the present invention displays as a list of thought names. One embodiment of the present invention keeps a list of all short term memory thoughts and long term memory thoughts. In addition, a list of thoughts is created for each defined thought type. Lists of thoughts can also be manually created (see below, "Trains of Thought" and "Searching"). The user can activate a thought in a list (make it central in the current plex) by clicking on it. Thought lists can also be used to perform group operations on thoughts such as printing, changing properties, or even saving (to save only a selected portion of the matrix). One embodiment used to maintain thought lists, using bitmap lists, is discussed in the "Determining If Thoughts Will Be Isolated" section above.

The Past Thought List. One special example of a thought list is the past thought list. FIG. 3 illustrates how a past thought list 380 can be created automatically as the user works. Each time the user changes the current thought, the number of the new central thought and the time it was activated are added; when the user stops working, a null and the time are added. In this manner, the present invention tracks the user's work with reference to the timeframe in which it was performed, and this information is recorded for later reference. In the one embodiment, it is possible to display the past thought list as a list (such as past thought list 380) of thoughts which scrolls along the bottom of the display as the user activates thoughts. For example, each time a user activates a separate thought, the previously activated thought is placed at the right-hand end of past thought list 380 pushing the older thoughts to the left of the screen. The oldest thought that cannot fit on screen is eliminated from view from the left-hand end of past thought list 380. This list may be scrolled to reveal thoughts that have disappeared.

Trains of Thought. Another special example of a thought list is the "train of thought," which lists a series of thoughts in a particular sequence as desired by the user. A train of thought can be created by simply navigating through the desired thoughts in the same order as the user wants them to appear in the train of thought. This will automatically cause the desired sequence of thoughts to become part of the past thought list, as noted above. As shown in FIG. 11, the user then interactively selects the desired section of the past thought list using mouse/control device 160. In the case of FIG. 11, the user has selected "Projects" and "Natrificial"—the two most recent thoughts—for inclusion in a train of thought. The user then interactively selects the Create Train command 1120 by using a pull down menu, function key or similar means. In response, the selected sequence of thoughts is copied to a new thought list and the user is asked to name it, thus creating a new "train of thought" thought list.

Trains of thought can be used for accomplishing tasks that involve a number of pre-existing parts. For example, an attorney might use a train of thought to assemble a number of pre-existing sections of text (stored in separate thought documents) into a new contract, or an engineer or computer programmer can use trains of thought to assemble a new computer program out of a pre-existing library of subroutines.

In one embodiment of the invention, a selected train of thought may be identified in a plex so that it is easier for a user to follow. Specifically, the active thought in a train may be identified, and the next and previous thoughts on the train may be highlighted in the plex. If the active thought is not in the train, then any thoughts in the train are highlighted. Optionally, arrows may also be drawn between thoughts in the plex to reflect the order of the train of thought.

Searching. Thought lists can be filtered or "searched" according to thought category, priority, name, flags, fields, or any other subject stored within a thought's headcase file or document. This allows the matrix to be used as a searchable database. For example, one thought type might be the type "Person," which might include the attribute "City." Each thought of the Person type would then be assigned a specific "City" value by the user. Users could then request a search of the matrix for all thoughts involving persons they know who live in a certain city, by requesting a display of all thoughts on the "Person" type list, filtered as to those whose "City" attribute equals the desired value.

Similarly, the present invention enables users to create project plans, daily agendas, or to-do lists or other task-oriented thought lists and create relevant thought lists. First, the user assigns priority levels (e.g., "urgent," "important," "unimportant") or flags (e.g., "completed" or "incomplete") to thoughts as they work (see "Changing Thought Properties" above). The present invention enables users later to create a to-do list, for example, by searching for thoughts associated with a flag set in the "incomplete" position and a priority level of "urgent." The matrix search engine operates in a method similar to those widely used in commercially available database programs.

Layers. A set (or sets) of layers may be applied to every document in the present invention. Subsequently, these layers may be selectively activated and deactivated. Layers that are "on" are displayed and available for editing, while layers that are "off" are hidden. Examples of layers can be found in many applications well known in the art such as Autocad® by Autodesk and Photoshop® by Adobe.

Usage statistics. Usage statistics suitable for keeping track of billable time, productivity, work habits or efficiency may be generated and stored for each thought as the user works on that thought, according to the system clock. These statistics include time of creation, time of last modification, time of last access by user and the time (if applicable) at which the thought was "forgotten." Each thought also stores the total number of seconds the user has so far spent processing it, the number of "events" (keyboard and mouse clicks) that occurred, and the thought's modification history (e.g., a list of all dates when that thought was modified and how long each such modification took).

In some embodiments, the system supports interactive commands for requesting the display of these usage statistics. For example, in one embodiment, a user can request to view usage statistics falling within a given time period. The present invention's preferences can be set so that the display reflects different aspects of the usage statistics. FIG. 3 demonstrates how one embodiment of the present invention can display usage information automatically. By default, some embodiments show a "C" next to each thought which was recently created (380); an "A" next to each thought which was recently accessed (380, 385); an "L" next to the last active thought (390, 395); and an "M" next to each thought which was recently modified (not illustrated). Alternatively, usage statistics may be reflected by differences in the color of thoughts, or by the addition of markers. For example, thoughts that have not been accessed for a relatively extended period of time might be displayed in a color such as gray that is less likely to attract the attention of the user.

Undoing and Redoing. Undoing and redoing of operations may be supported by an internally stored event list which keeps track of how data is affected and what is necessary to undo the effects of each event. When something is undone the undo event is recorded to the redo list to enable redoing.

Figure 15:
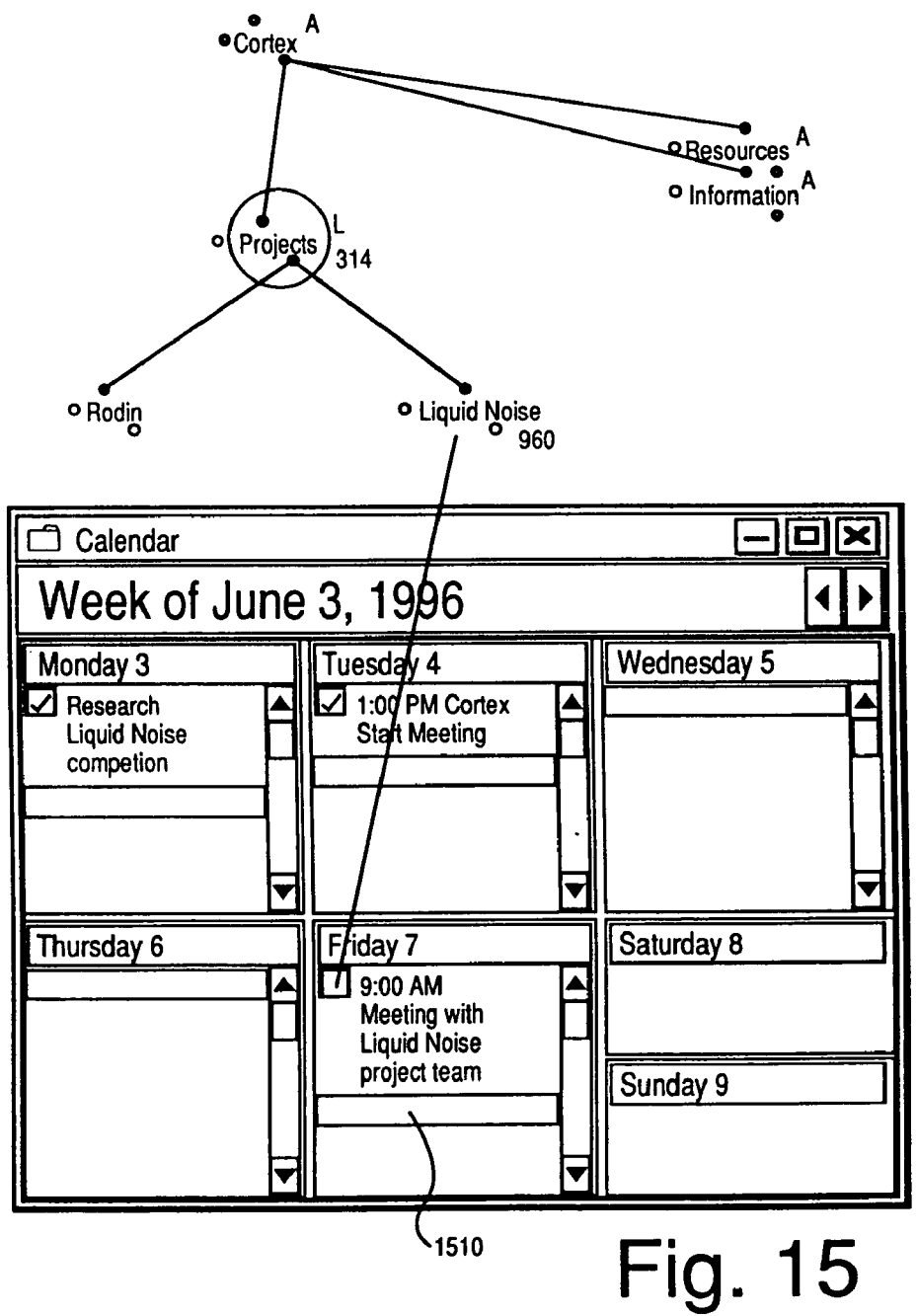
FIG. 15 illustrates one embodiment of a calendar window in conjunction with a hypothetical plex.

Calendar Scheduling. By storing thought numbers in events, appointments, schedule data, or other time-based items, it is possible to associate time-based events with thoughts. A calendar can then be used by the user to keep track of events and link related thoughts to the events. For example, in one embodiment, rather than displaying thoughts graphically in plexes, thoughts can be displayed on a calendar as demonstrated in FIG. 15. For example, the calendar event 1510 ("9:00 am meeting with Liquid Noise project team") may be associated with "Liquid Noise" thought 960. Some embodiments of the present invention permit a user to create that association by using the mouse/control device 160 to draw a line connecting the calendar event 1510 and the desired thought 960. When a user interactively selects calendar event 1510, thought 960 becomes the new central thought (as illustrated).

In addition, thoughts may be associated through calendar events with computer program operations. For example, if calendar event 1510 were associated with an alarm program, then at 9:00 am, the alarm would sound, and the present invention could also be configured to display a reminder message, or activate "Liquid Noise" thought 960 as the new central thought.

Preferences. Particular preferences relating to the operation of the presently disclosed technique may be selected by the user. The user may designate, for example, the set of colors to be used in the graphical representation of the interface and content organized thereby, the speed of the animation, the loading delay, the levels of thoughts to be displayed (e.g., which of the distant thoughts), and the wallpaper. Also saved to this table is information about the positioning of the various windows comprising the user interface and the information organized thereby.

Furthermore, all necessary information about the location of the present computer is stored with the preferences. Storage of this location information allows the user to move a matrix to another computer while preserving one's ability to access the files referenced by that matrix, provided that the files resident on the remote computer remain accessible from the computer to which that matrix is transferred.

Network-Related Features

Some embodiments of the present invention include features that enhance operability of the present invention in connection with both local and remote networks, including the Internet, as discussed below.

Remote Access to a Matrix. Some embodiments of the present invention allow the use of a matrix with a second computer, although the matrix was originally created on a first computer. To the extent the files on this first computer may be locally accessed, for example through a local network, the present invention will simply access these local files. However, if the files on the first computer are not locally accessible, the present invention can copy such files from the first computer to the local computer; so that this change is incorporated into the operation of the present invention, the present invention will additionally change the location of the computer with the file (to the second computer) so that the file may be locally accessed.

Sharing Thought Documents. With most current operating systems, document sharing is based on the location of a file within a hierarchical file system. The present invention locates thought documents according to the desired sharing properties. When the user sets the sharing properties of a thought, the document is moved to a folder that possesses the requisite sharing properties. When thoughts are created, they are assigned the same sharing properties as the thoughts from which they are created. The user may optionally change the sharing properties of several thoughts by using the List manager to create a list of thoughts and subsequently assigning the desired sharing characteristics to the thoughts on this list.

Version Control. By associating a thought with a special document type that stores the names of multiple documents, a thought may be made to contain a plurality of documents. The initial steps for creating a thought that contains more than one version of a document are the same as those normally used for creating a thought. When the user wishes to create a second version, however, the create version command is interactively selected, and the user can name the new version and select its type. The user may alternatively select the default type for the new version, which is that of the old version. With this process, the location property is changed to a new file which lists the versions of the document and contains a name and location for each version. In the thought's data within the headcase, the current version number is set to the current version. The names and locations of different versions of a thought can be changed using the thought properties dialog box. A version control is displayed in proximity to an active thought having multiple versions. The user may select this control to display a list of all versions of that active thought, and may thereafter select a desired version from this list.

Selection Feedback. One embodiment of the present invention facilitates the user's navigation through the matrix by monitoring the position of the user's cursor or pointer and highlighting the elements on the display that the user could select given the present position of the user's pointing device. In other words, this feedback system indicates the elements that would be activated upon the depression of a selection button resident on the user's pointing device, in view of the present position of the pointing device. For example, a gate, link, thought, or any other display element could change color to indicate that the element would be selected if the user depressed a mouse button.

Matrices Referencing Other Thought Matrices. A thought type can be a matrix, so it is possible for one matrix to reference another matrix. For example, in one embodiment of the present invention, when an active thought is itself a matrix, a second instance of the software of the present invention is started and it loads the appropriate matrix. This matrix is then displayed in a separate window. The ability of a user to create several matrices makes the present invention adaptable to a wide range of information storage needs, and accordingly diminishes the requisite complexity of individual matrices in cases suitable for multi-matrix storage schemes. In most of these cases, this added flexibility would likewise reduce overall system complexity. Furthermore, such an arrangement advantageously facilitates sharing of matrix data, as for example, a computer network administrator can more readily assign access privileges to single or multiple discrete matrices.

Linking Matrices. One embodiment of the present invention allows the user to link matrices together. In particular, when two matrices are displayed in separate windows, the user may copy a second matrix into a first matrix simply by dragging (with the cursor control device) from the first matrix to the second. The matrix that is dragged, the first matrix, is thereby linked to the active thought of the matrix to which it is dragged, the second matrix. The two matrices and all of their linked thoughts are thereby incorporated into the first matrix. Each of these thoughts from the second matrix that are copied into the first matrix must be renumbered during the copying process so that they do not conflict with previously-existing thoughts associated with the first thought matrix.

Matrix Sharing. A token system is used in one embodiment of the invention to allow multiple users to simultaneously modify a single matrix. In accordance with this system, when a user requests a modification, all other users are not permitted to make modifications until the matrix is updated to reflect the first user's modification. In a multi-user environment, the past thought list and other usage data may be stored once for each user, and optionally may be unified to produce data for all of the users.

Semi-Hierarchical Arrangement. In some instances, a user may prefer to arrange portions of their information in a traditional hierarchical manner. This may occur, for example, if the data is particularly susceptible to storage in a highly-structured manner and if the user has some preexisting familiarity with a hierarchical information storage structure. One embodiment of the present invention therefore allows users to store information in a purely hierarchical structure, and to access this data through traditional operating system methods. This traditional storage structure, however, may be integrated with the storage structure of the present invention to allow the present invention to store other data. For example, a company may wish to store information organized by the management divisions within the company. The company could create a set of folders for each division and then a second level of folders for each employee within a division; then, matrices may be placed within each employee folder, for example, corresponding to each individual employee.

Just-in-Time Server Model for Sending Plexes. When a large matrix is created and subsequently must be accessed over a communications channel having a relatively narrow bandwidth, it is possible to send only data that is relevant to a user's location within that matrix. This is accomplished with client/server computer network architecture. In one embodiment, the client software of the present invention identifies for the server the presently active thought. The just-in-time server software of the present invention then sends the numbers of all thoughts within the present plex, as well as the numbers of all thoughts that would become part of the plex upon the selection of any thought within the present plex. In other words, the server will send the number of the active thought, its children, parents, jumps, and siblings, as well as the children, parents, jumps, and siblings of those thoughts. This list of numbers is used by the client to determine which thoughts are already in the client's cache. Those thoughts that are already in the client's cache should be removed from the list, and then the list is returned to the server. At this point, the server sends the data corresponding to all thoughts remaining on the list. The above-described cycle is repeated upon the selection of a new central thought.

In another embodiment of the invention, an alternative procedure may be used to implement client-server communication. Specifically, on a client's first interaction with a server, the client sends an initialization message to the server that includes its location on the network. The server creates a blank list that may be of the same type as the ThoughtList used to identify isolated thoughts, and uses this list to identify the thoughts already sent to the client. Then, for each thought activated by the client's user, the client identifies the presently active thought to the server. In response, the server generates a list of thoughts having a predetermined relation (e.g., within a set number of generations) to the active thought, removes from the list any thoughts already present on the client, sends to the client the data corresponding to all thoughts remaining on the list, and adds these sent thoughts to its list of thoughts present on the client.

In accordance with these methods, the present invention minimizes the extent to which data is unnecessarily downloaded, and assures that data relating to the next-selected plex will be immediately accessible. The above-described methods enhance performance by minimizing the delay inherent in a client-server system constrained by a narrow bandwidth telecommunications facility.

Integration With Hypertext. One can incorporate matrices into hypertext by embedding so that the client software of the present invention is launched and displays the file when the hypertext page is loaded by a browser program. Alternatively, the file could be loaded and displayed in response to the selection of its link by the user. Furthermore, it is possible to define a matrix using text that is transferred to the present invention in a format such as: [Thought Number, Thought Name, Thought Location, Parents, 0, Children, 0, Jumps, 0]. Such a format could be embedded and created using a typical hypertext editor, and the present invention would simply convert this format into the normal file format and display it. Hypertext languages could also be modified to be more similar to the matrix structure simply by identifying links as either parent, child, or jump links. Such a modification would allow the present invention to base matrix creation directly upon a reading of the hyperlinks, without the need for an intermediate format conversion step.

Spider Site. Using the methods disclosed above, the present invention has the capacity to automatically generate a matrix corresponding to a map of a web site. A server can be employed to create and store such matrix-maps, and to send cached versions of the matrix-maps upon request. The sites to be mapped by this server may be identified through a list provided to the server, or the server could use web crawler techniques presently known to those of ordinary skill in the art to identify sites to be mapped.

Alternative Matrix File

Figure 16:
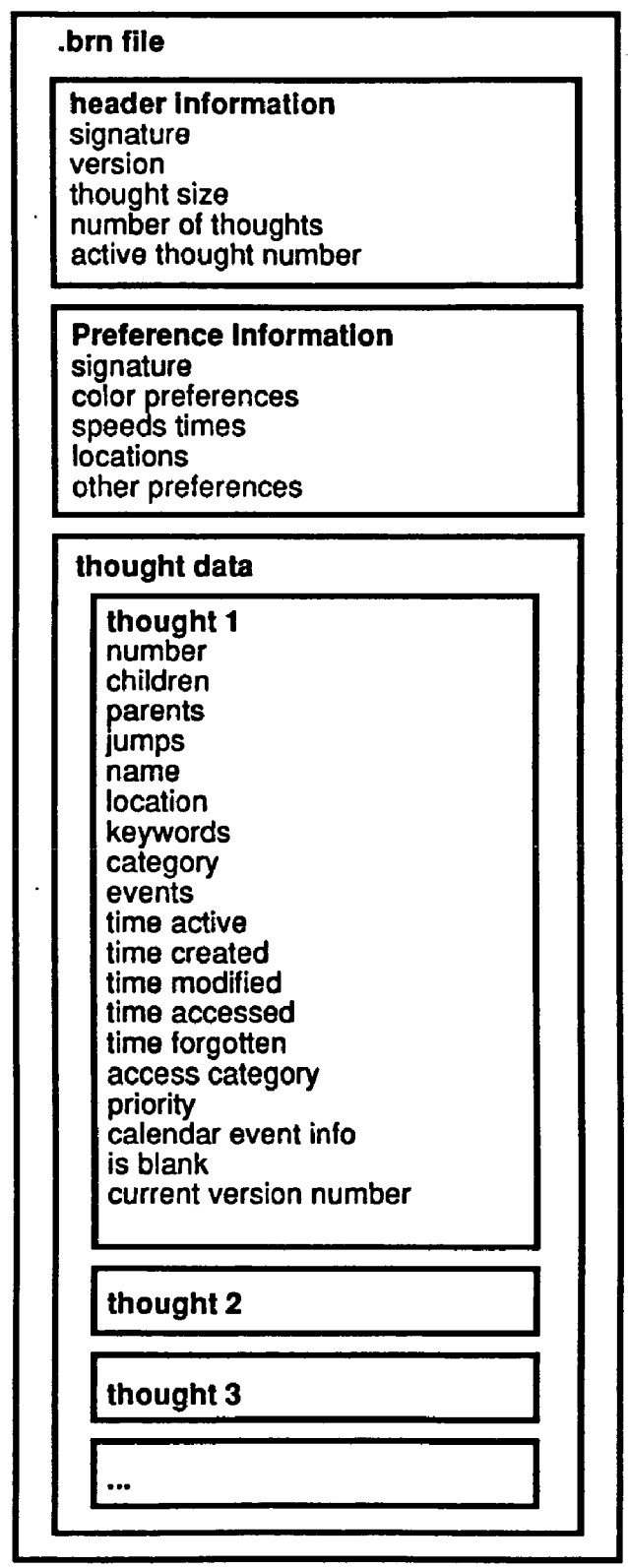
FIG. 16 illustrates the data architecture of one embodiment of the ".brn" (modified headcase) file of the present invention.

In an alternative embodiment of the present invention, the characteristics of the above-described matrix and Headcase files may be modified to permit improved functionality for certain applications. The data architecture of this modified file, hereafter referred to as the ".brn" file, is illustrated in FIG. 16. As can be seen, the .brn file contains additional elements and a different organizational structure than the headcase file illustrated in FIG. 2. While multiple file structures are clearly permissible, the selection and implementation of a single standardized structure may be particularly advantageous; the use of a universal file format allows data to be transferable across different operating platforms. For example, a matrix created in a Microsoft Windows® operating environment could be read by a UNIX-based version of the present invention. With this background, the principal differences between the .brn file and a generic matrix file are addressed below.

The .brn file stores all information describing the interrelation among thoughts. The file may be named by the user, and is assigned the extension ".brn." The present invention also creates a folder that is assigned a name similar to the .brn file, except that the folder is given the extension "_brn." A preponderance of the .brn file is composed of a flat file database. This structure allows thoughts to be located based on their numbers. As FIG. 16 illustrates, a thought's location in the .brn file is equal to the size of the header information, added to the size of the preference information, added to one less than the number of the thought multiplied by the size of a thought ("thought size" in the header information).

The _brn folder. All information specific to a matrix that is not contained in the .brn file is stored in the _brn folder. This folder may contain an index file for locating thoughts within the thought data, using either thought name or location. It may also contain a variable field length database for storing information relating to thoughts having unpredictable sizes, notes, and perhaps even files and versions of files. These notes may be created by a simple word processor capable of including OLE objects and thus pictures, spreadsheets, and other data. In one embodiment, notes relate to individual thoughts and are automatically loaded and saved as the associated thought is activated and deactivated. The _brn folder may also contain the past thought list, as well as the list of parentless thoughts.

Internal and External Files. Internal files, such as files located in the _brn folder, are deleted when their thoughts are permanently forgotten. Internal files are convenient because they are aggregated at a single location and are easily copied or backed-up along with the remainder to the _brn folder. External files are those not in the _brn folder, such as those in another folder, or stored remotely on a computer network including, for example, the Internet. As distinguished from internal files, these external files are not deleted when their thoughts are permanently forgotten because they could have some other use.

The user can request that an external file be converted to an internal file by selecting a "To Internal" command and specifying a location. In response, the present invention will then move the files to the specified location and will change the location of the thought file. The user can similarly use a "To External" command to convert an internal file into an external file stored at a specified location. The present invention implements this change by moving the file to the specified location and changing the location of the thought file. If the present invention attempts to create or move a file into the _brn folder, but the file name is already in use, the present invention will add a number to the end of the file name and will continue to increment that number until the conflict is resolved.

Communications Amongst Content Users

Figure 26:
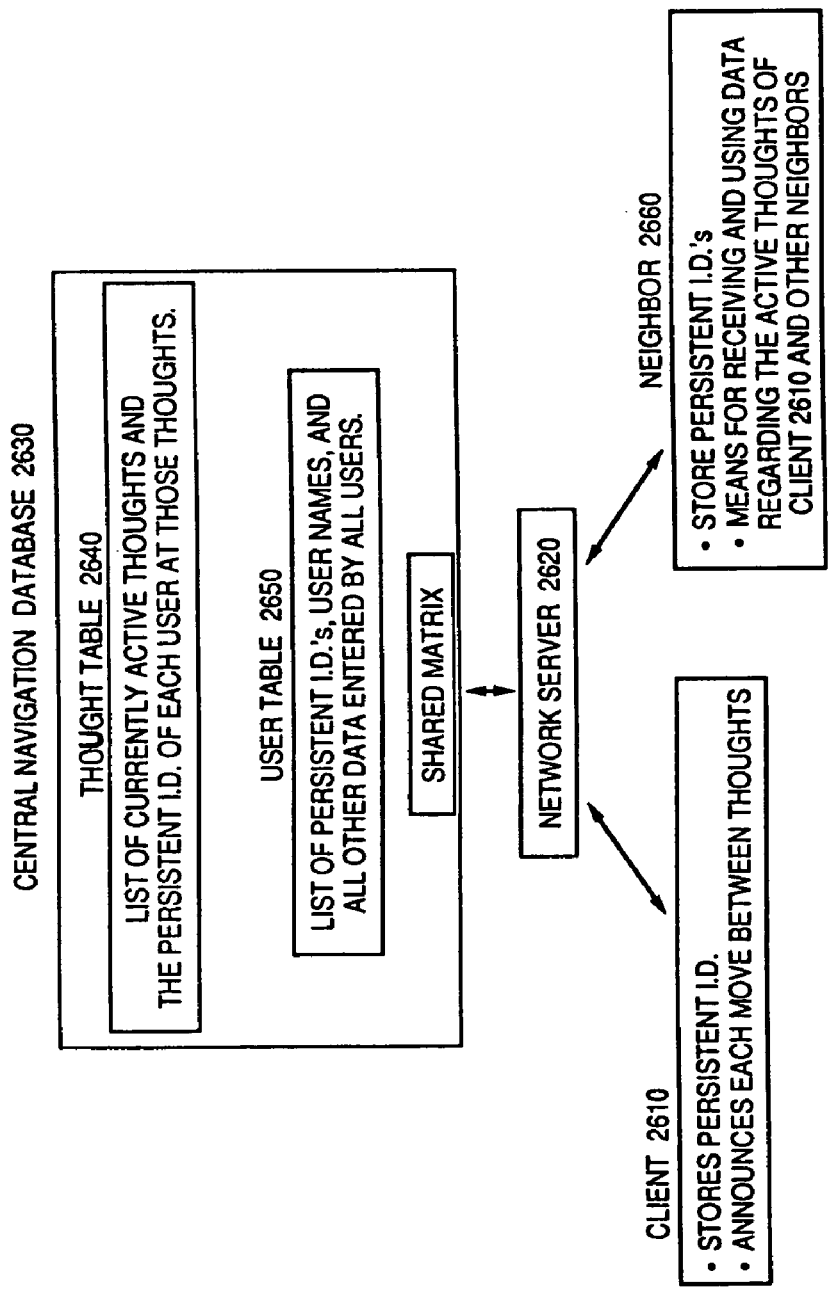
FIG. 26 illustrates a network structure for facilitating communications amongst content users.

Another aspect of the present invention permits network users to identify and communicate with other users of shared content. For purposes of illustration, an embodiment connected with the plex, matrix, and thought structures of the current invention is disclosed in this section. Note, however, that this aspect of the current invention can be implemented in conjunction with any set of segmented data that is shared amongst multiple clients or users. FIG. 26 illustrates the requirements of such a shared data structure and computer network.

Minimally, the structure includes: client 2610, a computer running network communications software capable of storing a unique and persistent client identification number ("persistent I.D.") and capable of transmitting that persistent I.D. to a network server 2620 each time it activates a different thought to be the new central thought; a network server 2620 computer capable of transmitting and receiving data to and from multiple computers linked in a network of the type known in the art; a central navigation data base 2630 capable of storing an entire matrix of thoughts along with a thought table 2640 which associates the persistent I.D.'s of clients currently accessing thoughts as central thoughts along with the thought numbers of those central thoughts, and a user table 2650 of persistent I.D.'s and optionally other user data related to those persistent I.D.'s; and optionally other clients or neighbors 2660 also identified by persistent I.D.'s and capable of retrieving data from the network server 2620 relevant to client 2610, other neighbors 2660 and the current central thoughts of client 2620 and those other neighbors 2660.

Registering with the Network Server. In one embodiment, the client obtains its persistent I.D. from the server following a registration process as follows:

Client 2620 selects a user name (or alternatively a username is assigned by the server). That username may be the same as the persistent I.D., or for user convenience, the user may select or assign a unique human language username that is different from the persistent I.D. Optionally, in registering, the client software may also request from the information relating to the computer or user's communications means such as street address, phone number, electronic mail address, IRC or chat software, internet telephony software, video or conferencing software or any other protocols or means necessary for conveniently enabling neighbors 2660 to communicate with the client 2610. The client software may also optionally request other information relating to the computer or the user at client 2610. Upon receiving this user data, server software at network server 2620 checks with user table 2650 for an available unique persistent I.D., and assigns that persistent I.D. to that client 2610 by creating a record under that persistent I.D. within the user table 2650. The network server 2620 then responds to client 2610 by sending the persistent I.D. to the registering client 2610 and software at client 2610 stores that unique persistent I.D. for later use.

Figure 28:
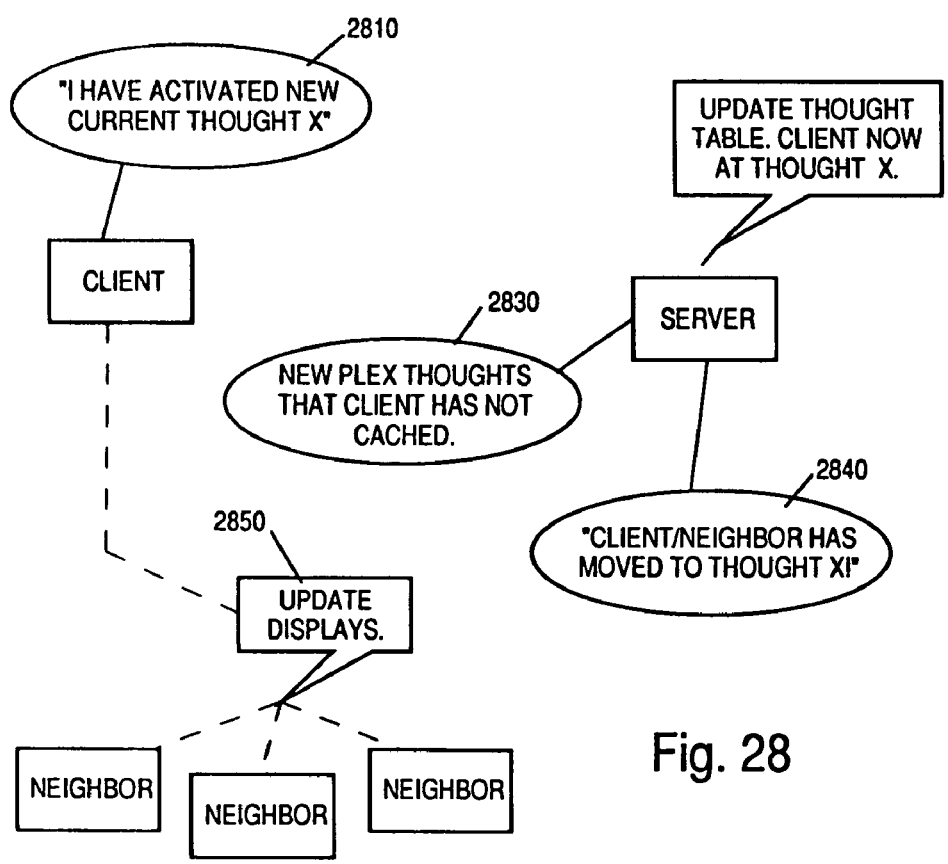
FIG. 28 illustrates a client-server dialog enabling multipoint sharing of users' positions within a matrix.

Sharing Content Usage Data Amongst Users. Once such a persistent I.D. has been assigned, the network server 2620, in combination with the central navigation data base 2630, monitors the current central thought of the client and makes that and the client's registration data available to the neighbors 2660 as illustrated in the dialog illustration of FIG. 28.

Any time client 2610 activates a different central thought as described above (See, Matrix Navigation, above,) at step 2810, that client 2610 sends a message to the network server 2620 that a client with unique persistent I.D. "X" has activated thought number "X" as its new central thought.

At step 2820 network server 2620 updates the thought table 2640 to reflect a new persistent I.D. "X" associated with thought number "X" (2820). Optionally, by implementing the methods described above, that server 2620 can query that client 2610 to determine which new thoughts within the resulting plex are not cached with client 2610 and at 2830 transmit those thoughts to the client 2610. (See, Just-in-Time Server Model for Sending Plexes, above.)

Next, using known point to multi-point communications techniques, at step 2840 a preferred embodiment of the present invention will send back to the client 2610 and, as applicable, the neighbors 2660 data regarding the quantity and/or identity of all neighbors whose current central thoughts are within the plex. This data can be transmitted to the client 2610 each time that client 2610 activates a new central thought, each time any neighbor 2660 activates a new central thought within the current plex, at regular time intervals, or upon explicit request by the client 2610. At step 2850, the displays of client 2610 and neighbors 2660 are updated to show the new positions in the plex of each user.

Maximally, the data transmitted can include all registration data regarding all neighbors currently within the plex. Minimally, that data can include just the overall number of neighbors at just the central thought. Alternatively, a mixture of data relevant to neighbors can be sent, such as the overall number of neighbors at each thought, plus specific data related to certain neighbors ("buddies") who have either been pre-specified by the client 2610 or whose registration data contains certain elements. For example, certain neighbors may be designated as system operators or customer service representatives who are always available for help to all neighbors and whose identity and data will always be available to all neighbors within the plex.

Figure 29:
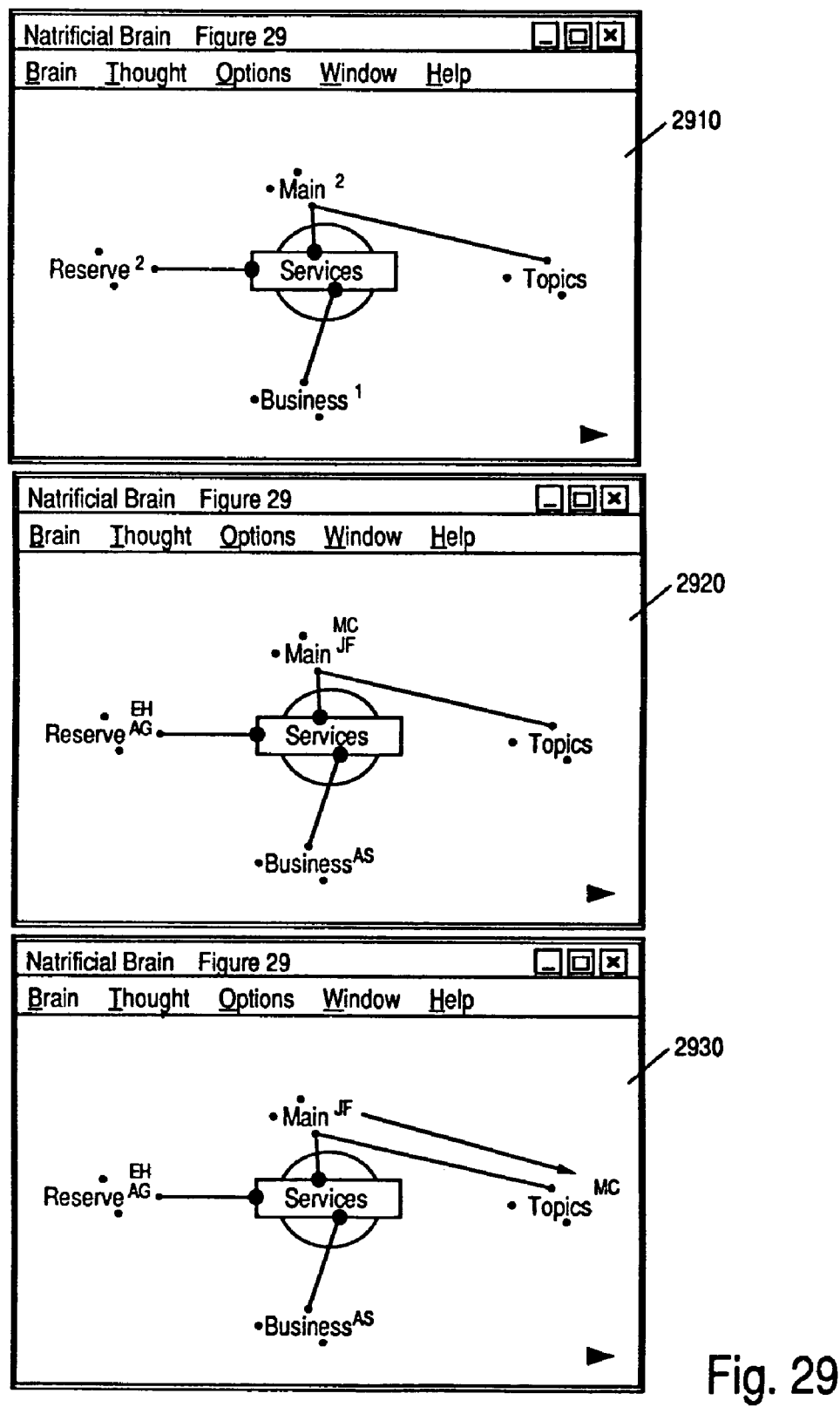
FIG. 29 illustrates examples of screen displays showing positions of other users of a plex.

Representing the Shared Plex. There are numerous methods and combinations of methods possible for representing the identity and/or quantity of neighbors at the client's active thought or at other thoughts within the current plex. FIG. 29 illustrates hypothetical screen displays resulting from those methods. For example, as in screen shot 2910, a number or icon of variable size can be displayed in proximity to the central thought and/or other thoughts within the plex representing the quantity of neighbors at those thoughts. As shown in screen shot 2920, if there are only a few neighbors, each neighbor can be represented by its user name, a dot, or a representative icon or avatar (graphical character). A mixture of the neighbor quantity representations or neighbor identity representations is also possible so that there might be a quantity indication accompanied by specific identification representations of only buddies. In embodiments where the network server 2620 sends a message to all neighbors when any neighbor changes its current active thought, the plex display of the client 2610 and neighbors 2660 can be updated to show the movement of neighbors amongst thoughts within the plex as screen shot 2930 demonstrates.

Communications Amongst Neighbors. The present invention can also conveniently facilitate communications amongst neighbors. In embodiments where the user table 2650 contains information relevant to the communications methods available to neighbors, that data can be made available to the client 2610 and the neighbors 2660. In those embodiments, when a user at client 2610 activates an icon representing a neighbor 2660 within the plex, the client 2610 requests from network server 2620 the data from user table 2650 identifying the methods of communication available to that neighbor 2660. The user at client 2610 can be presented with a dialogue box listing the communications methods or protocols commonly possessed by both client 2610 and that neighbor 2660. If any of those communications methods are methods utilizing a shared communications network such as the internet, the user at client 2610 can activate the appropriate communications software by selecting the appropriate choice from the dialog box. Alternatively, the user at client 2610 can utilize a telephone, mail or other traditional means specified within neighbors' communications data. While the specific network communications software such as internet telephony, internet chat, internet video conferencing and electronic mail are not within the ambit of the current invention, a number of such means are widely available in the art, as are means for creating machine interfaces between the network communications architecture of the current invention and those known communications methods.

Instant Publishing of Matrices

Certain efficiencies can conveniently be achieved under the current invention by enabling a user of the client software to publish a matrix to a shared network of users. For purposes of illustration, an embodiment connected with the matrix, thought, and .brn file structure and client-server architecture of the current invention is disclosed in this section. Note, however, that this aspect of the current invention can be implemented in conjunction with any set of references to data shared across a network, such as the "bookmark" files known in the art of internet world wide web design, that are user-configured references to shared network documents.

Figure 27:
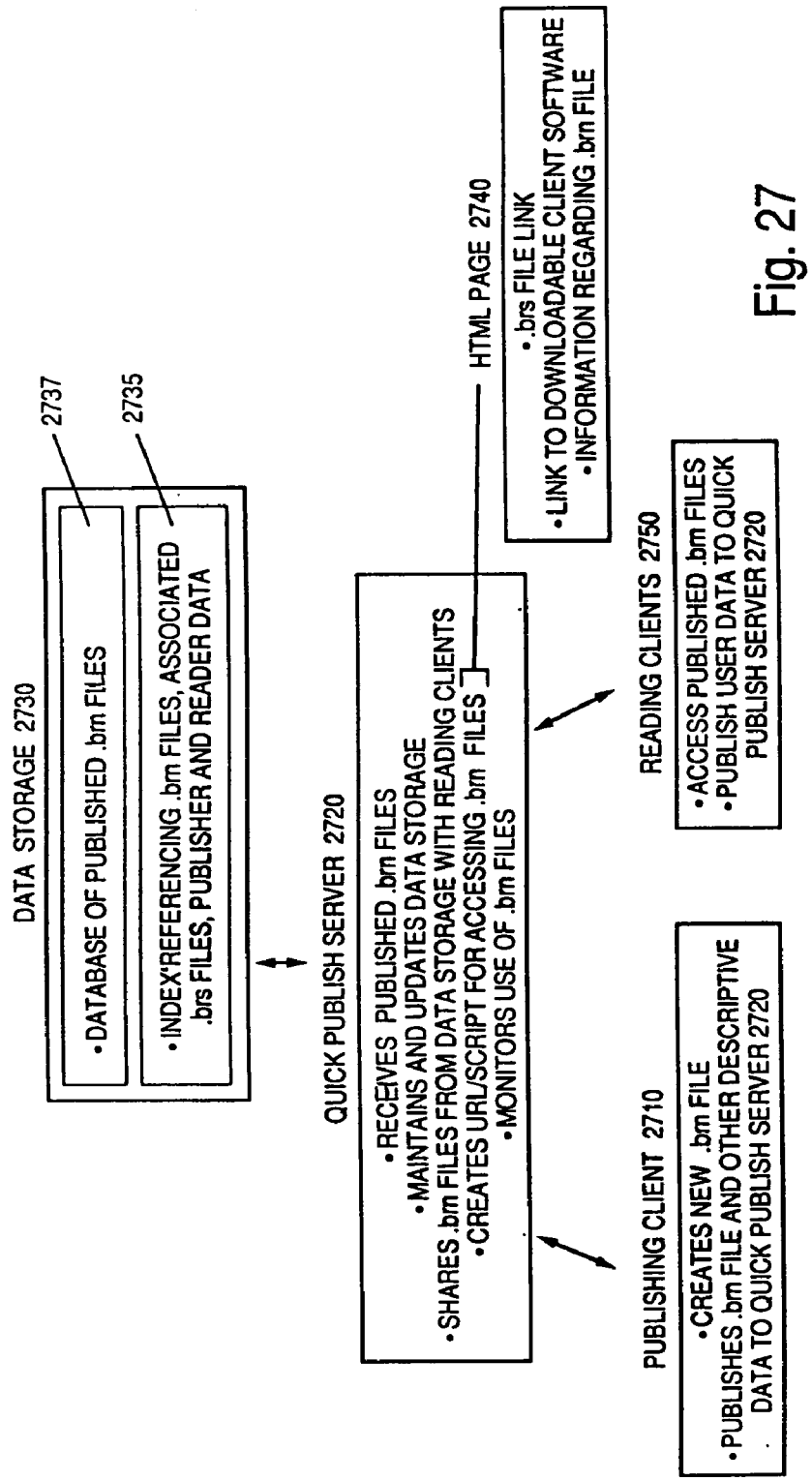
FIG. 27 illustrates a network structure for facilitating users' publishing of sets of sets of references to shared data to other users.

FIG. 27 illustrates the minimum requirements of such a shared data structure and computer network. Publishing client 2710 is a digital computer running client software under the present invention, enabling the user to create new matrices, and transmitting those matrices and other data to a quick publishing server 2720. The quick publishing server can be the just-in-time server specified above (See, Just-in-Time Model for Sending Plexes), or any other digital storage, retrieval and transmission apparatus, such as a computer network server of the type known in the art, minimally capable of distributing digital information from a single point to many points or clients in a network. In the preferred embodiment, quick publish server 2720 is a digital computer running programs enabling it to (i) receive .brn files from the publishing client, maintaining a database 2730 of such published .brn files and other data transmitted by that publishing client, as well as statistics related to at least the quantity of usage of those shared .brn files by reading clients 2750, and optionally other usage data; (ii) create html or another interactive document 2740 that minimally may include a .brs file pointing to the published .brn file, and which may include a function permitting new reading clients 2750 to download a the client computer program for reading and/or creating .brn files under the current invention; (iii) transmit thoughts or .brn files from the database 2730 to the reading clients 2750, for example, using the methods described above (See, Just-in-Time Server Model for Sending Plexes;) and (iv) optionally monitoring access to the database 2730 by reading clients 2750.

Figure 30:
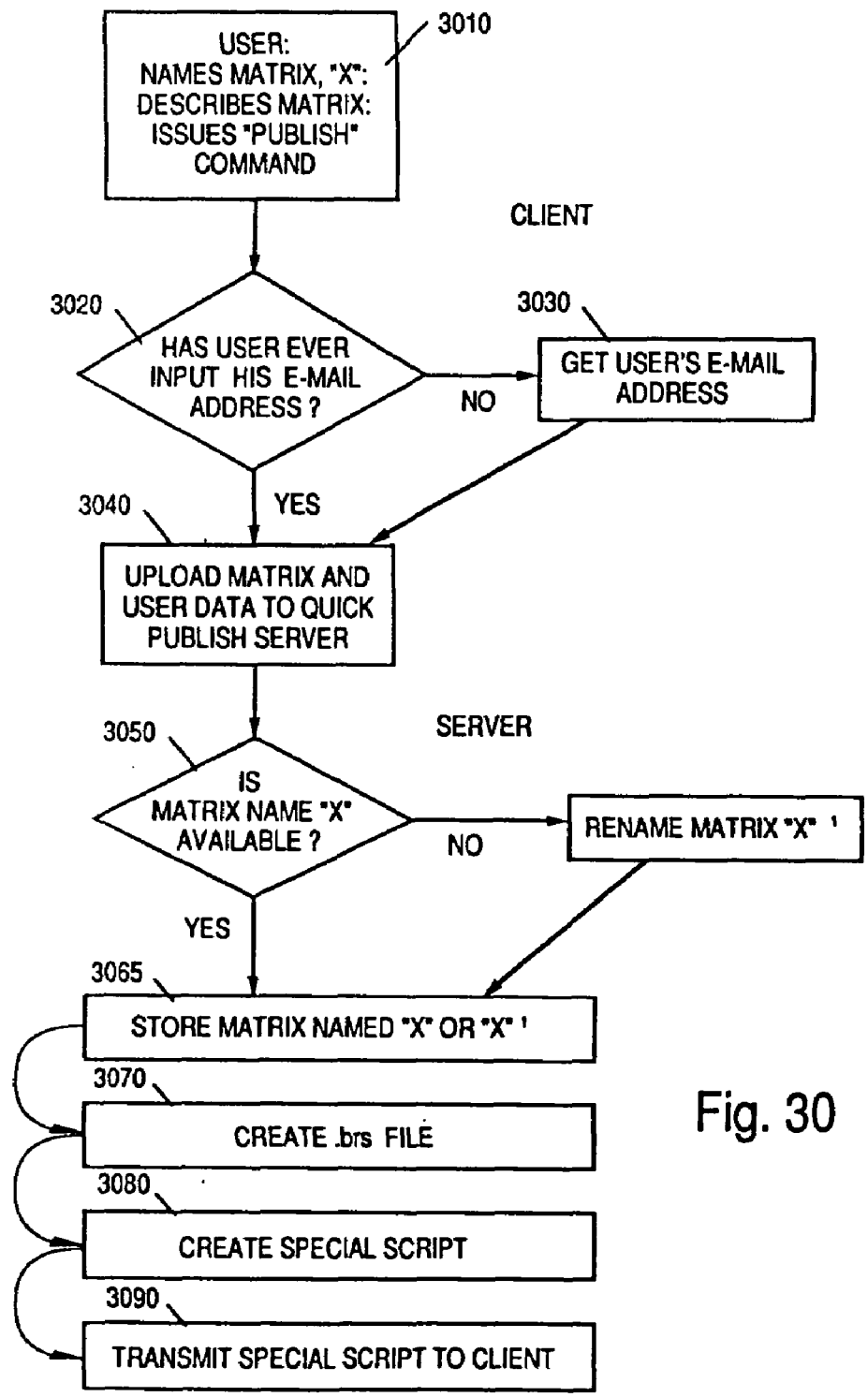
FIG. 30 illustrates a flow chart showing a method for implementing an instant matrix publishing embodiment of the present invention.

The process starts with a user or a computer at publishing client 2710 creating a matrix .brn file, preferably composed of thoughts whose documents are commonly available to other users by means of a shared digital network such as the Internet or other computer network. FIG. 30 illustrates the process of publishing a shared matrix.

Software under the present invention permits the user or computer at publishing client 2710 to input a command 3010 (preferably by graphical user interface means such as a button or menu item) to name and upload that entire matrix to a quick publish server 2730, such as the just-in-time server described above (See, Just-in-Time Server Model for Sending Plexes). Once the command is selected, if publishing client 2710 has not previously received the user's e-mail address (Query 3020) or network username, then at step 3030 the publishing client 2710 software requests that the user input that information, and optionally may request other relevant information such as the user's name, a description of the content, and other data that may be useful for reading clients 2750 who ultimately will access that matrix from the quick publish server 2720. Completing this information input, the user (for example by interactively selecting an "ok" button) activates an interconnection between publishing client 2710 and the quick publish server 2720, which preferably occupies an internet protocol or other network address previously configured within the software of publishing client 2710. In step 3040, at the quick publish server's 2720 direction, publishing client 2710 then transmits the .brn file embodying the matrix and the relevant information to a storage device 2730 to which the quick publish server 2720 preferably has constant uninterrupted access.

In the preferred embodiment, the quick publish server 2720 now transmits a message to the user at publishing client 2710 that the data has been sent and to expect a message via e-mail or other convenient communications means shortly. The quick publish server 2720 stores the .brn file and associated information to the data storage 2730, renaming the .brn file if that data storage 2730 already contains another .brn of that name. (See, steps 3050, 3060, and 3065.) Then, at step 3070, the quick publish server 2720 creates a .brs file is created that contains network address of the quick publish server 2720, and the location of the .brn file within the data storage 2730. The locations of both the .brs and .brn files are added to an index table 2735 maintained within the data storage 2730. Software at reading clients 2750 enables users to instruct the quick publish server 2720 that they wish to access the published .brn file now stored at the digital storage 2730. The method described above, or other methods, can be used to enable such access (See, Just-in-Time-Server Method for Sending Plexes.)

In the preferred embodiment, at steps 3080 and 3090, the quick publish server 2720 then communicates a message to the publishing client 2710, by electronic mail or other known means, containing a uniform resource locator (URL) or other known network protocol, that designates a script. The unique name, of the published .brn file is incorporated into that script as a parameter. Minimally, the URL and the script it designates perform two functions.

First, upon activation by any of the reading clients 2750, it instructs the quick publish server 2720 to generate an html page 2740 or other interactive document optionally containing (i) a brief description of the client software under the present invention, and inviting new users to download it from the network; (ii) an interactive button or other means permitting users to instruct a server to upload the client software to them; (iii) a description of the published .brn file;

and (iv) a link to the .brs file, the activation of which gives the reading clients 2750 access to the .brn file. Second, it updates the index table 2735 to reflect that the designated .brn file was accessed.

In the preferred embodiment, activating a .brs file the html page 2740 may update the index table 2735 to indicate that a certain .brn file was accessed. Optionally, in embodiments where first-time users of the reading clients 2750 are required to register with the quick publish server 2720 by providing certain user information, the index table can also be updated to reflect the nature of user that has just accessed the certain .brn file.

In a preferred embodiment, to conserve network resources, the quick publish server 2720 will periodically query the index table 2735 to see if any .brn files are not being regularly accessed. If not, then the quick publish server 2720 can either delete those .brn files from data storage 2730, or send a message to publishing client 2710 that the .brn file is in danger of being deleted.

In addition to the benefits of enabling unskilled users to publish complex content, utilizing the customer information database maintained at data storage 2730 enable public users to search for and identify potential friends, business partners, or even advertising sites. For example, using database search techniques known in the art, users could query the quick publish server 2720 to query the database maintained in data storage 2730 for .brn files along a number of parameters such as (i) containing thoughts named certain key words; (ii) above a certain size; (ii) created on, before or after a certain date; (iii) accessed with a certain level of frequency; (iv) created by male or female user with certain personal characteristics; or even (v) accessed by users with certain characteristics. Advertisers could arrange with the proprietor of such a quick publish server to display certain advertisements within the html pages generated in conjunction with certain .brn access scripts described above, or even within the .brn files themselves as thoughts are accessed. A more complex query might involve instructing the quick publish server 2720, using known database indexing and search techniques, to compare a given .brn file with the .brn files stored at digital storage 2730, and output the best matches.

Speech Recognition

The present invention also enables substantial advantages when adapted as a speech-commanded navigation system. For the purposes of illustration, an embodiment connected with the matrix, thought and plex structure of the current invention is disclosed in this section. Note, however, that this aspect of the current invention can be implemented in conjunction with any computer system that provides for file management, browsing, of navigating by identifying files or pieces of information with words in a human language.

It is well known in the art that one limitation faced by all speech recognition methods is the problem of distinguishing amongst the tens of thousands of words in any human language. In a speech system adapted for navigating amongst thoughts, the user can activate any thought by saying its name, because thoughts are words that can be indexed by their names as well as numbers.

Since a matrix will not normally have more than a few thousand thoughts, that speech system needs only distinguish amongst that limited set of words. Additionally, that speech system can further drastically limit the number of words it needs to compare to the voice command by only checking thoughts in short term memory, or by only checking thoughts that are currently being displayed (in the plex, past thought list, or in pins). Training of such a system can also be accomplished by teaching it how each thought sounds when it is created. For example, a user could speak the name of a new thought simultaneously with entering it on a keyboard. This way, the system can be very accurate without imposing upon the human user a tedious and slow training session.

Parallel Web

Prior art information networks systems lack a method of relating data relevant to shared documents to particular users, without changing those shared documents. Another aspect of the present invention, a "parallel web" system, enables network users to create content that is associated with particular web pages or network documents, but is visible only to a select group of network users.

A parallel web offers users of the present invention to share and view matrices and notes related to web pages and other shared content. For purposes of illustration, this section discloses embodiments related to the thought, plex, matrix and client server architecture of the present invention. Note, however, that a parallel web can be implemented in conjunction with any data that users wish to associate with shared content and distribute to select other users. Examples of that additional data include alternative navigation systems, private comments about common shared data, usage statistics, enhanced content for users with high bandwidth connections, links to related data, or even contests amongst multiple users of shared data.

Figure 31:
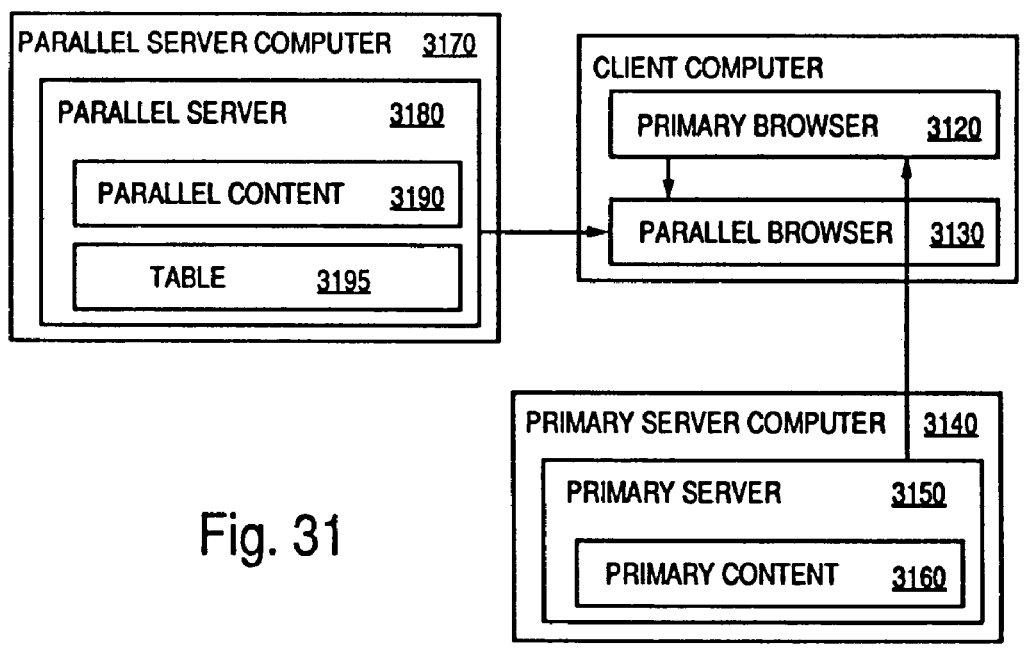
FIG. 31 illustrates a network structure for parallel content distribution.

Operating a Parallel Web. FIG. 31 illustrates the minimum requirements of a parallel web's shared data structure and computer network. Client computer 3110 is a digital computer running two types of client software functions. It runs a primary web browser 3120 or document retrieval system minimally capable of displaying documents loaded from a primary server computer 3140. It also runs a parallel browser 3130 minimally capable of displaying associated items of parallel content 3190 downloaded from a parallel server computer 3170, using a method of monitoring the actions of primary browser 3120 such as that illustrated in FIG. 32. In the preferred embodiment, that parallel browser 3130 operates in the background, invisible to the user, until it automatically activates itself to display items of parallel content 3190 to the user.

Primary server computer 3140 is a digital computer such as a conventional network or internet server running a primary server 3150 software function such as a web or other document server, and storing primary content 3160 such as web pages, network documents, motion pictures or other content. Primary server function 3150 minimally is capable of uploading items from that primary content 3160 upon request by primary browser 3120.

Parallel server computer 3170 is a digital computer such as just-in-time server discussed above running a parallel server 3180 software function, storing parallel content 3190, and indexing that content in a table 3195 correlating items of parallel content 3190 to the addresses or URLs to associated items of primary content 3160. Parallel server function 3180 minimally is capable of uploading items from that parallel content 3190 upon request by parallel browser 3130, using a method of responding to requests such as that illustrated in FIG. 33.

Note that the parallel server computer 3170 and the primary server computer 3140 can be the same digital computer operated by a single user or administrator. Alternatively, the parallel server computer 3170 can be operated by a separate user wishing to offer content associated with yet distinct from items of primary content 3160.

Figure 32:
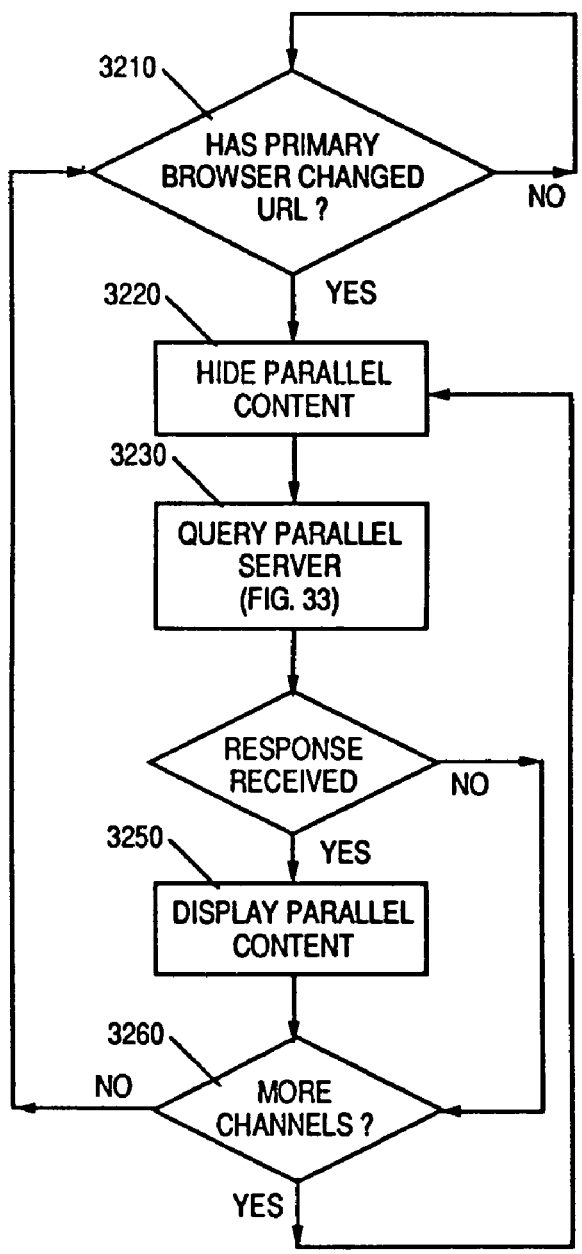
FIG. 32 illustrates a flow chart describing one method of implementing a parallel content browser.

In one embodiment, parallel browser 3130 loads and displays items of parallel content 3190 in synch with primary browser's 3120 requests for items of primary content 3160 according to the method illustrated in FIG. 32. At step 3210, using known methods of monitoring the addresses of documents accessed form a network using popular browsers such as Netscape's Navigator and Microsoft's Internet Explorer, the parallel browser 3130 monitors whether the primary browser 3120 has requested a document of a different address or URL from a primary server 3150. If primary browser 3120 has not changed URLs, the parallel browser 3130 waits at step 3210 and reinquires. If the primary browser has changed URLs, then the parallel browser 3130 stops displaying the current item of parallel content, if any. In a preferred embodiment, the parallel browser 3130 and the parallel server 3180 can be set to ignore a portion of the URL, so that items of parallel content 3160 can be made to appear simultaneously not just with an item stored at a specific URL (such as "http://www.acme.com/roadrunner/traps/bannana_peels"), but also within a certain directory or within a certain domain (such as "http://www.acme.com"). Applying the plex and matrix means of the current invention, not just one document, but a group of documents can be made to correspond to a single thought within a plex in this manner, and the user's plex display would not be updated by the just-in-time server method described above.

Figure 33:
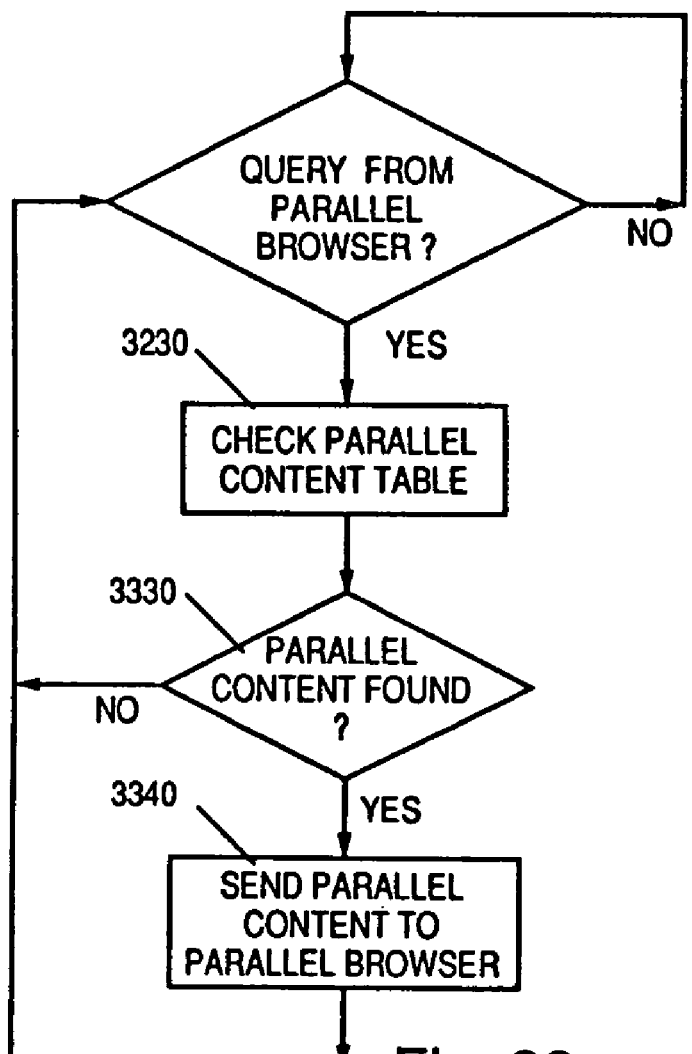
FIG. 33 illustrates a flow chart describing one method for implementing a parallel content server.

At step 3230, the parallel browser 3130 then sends a query to parallel server 3180, inquiring, according to a method such as the one illustrated in FIG. 33, whether there is any item of parallel content 3190 associated with that URL. If parallel server 3180 uploads an item of parallel content in response, then at step 3250, the parallel browser commands display means in client computer 3110 to display that item. In a preferred embodiment, a parallel browser 3130 can be configured with multiple channels to seek various sources of parallel content either from the same parallel server 3180 or from a different parallel computer 3170 entirely. The parallel content available through those different channels can vary by the sort of content (video, plexes, comments, contest data), or by various sources of similar content. For example, it is possible that more than one shared matrix under the current invention possesses a thought corresponding to that URL, and the parallel browser 3130 could be configured to send queries to more than one just-in-time matrix server.

So if no items of parallel content 3190 are received from the parallel server 3180 at step 3240, or following the display of the newly received parallel content at 3250, then at step 3260 parallel browser 3130 inquires whether the user has stipulated additional channels. If so, then the parallel browser 3130 again queries the appropriate parallel server 3180 at step 3230. If not, then returning to step 3210, the parallel browser again checks the primary browser 3120 has changed URLs.

Corresponding to the parallel browser method illustrated above is a method that can be used by parallel server 3180 to upload appropriate items of parallel content. FIG. 33 illustrates such a method. At step 3310, parallel server 3180 monitors whether it has received a request from any parallel browser such as 3130. Such a request contains a URL being activated by primary browser 3120, and optionally the identity of a specific channel within the items of parallel content 3190. At step 3320, parallel server 3180 checks parallel content table 3195 to see if there are any items of parallel content 3190 corresponding to that URL and channel. If no parallel content items are found, then parallel server 3180 sends a negative response to parallel browser 3130 and returns to step 3310 to continue monitoring for incoming requests from parallel browsers. If the table 3195 indicates that any item of parallel content 3190 does correspond to the requested URL and channel, then that item is uploaded to parallel browser 3120. Note that in an alternative embodiment, the parallel server function 3180, the parallel content table 3195, and the parallel content 3190 can all reside on different digital computers linked in a network.

Adding Parallel Content. One benefit of the parallel web is that users can make additions to the parallel content 3190 at any time, since parallel browsers such as 3130 requery the parallel server 3180 every time the primary browser 3120 changes URLs. Parallel content can be offered by any party in relation to his own primary content 3160 or the primary content of another. Those additions, of course, do not change any aspect of the corresponding primary content available to network users.

The process for adding to parallel content 3190 is simple. A user sends items of parallel content, along with the corresponding primary content URL, and channel identifier, if any, to a parallel server 3180. The user also specifies whether existing parallel content is to be replaced or augmented. Different users can be assigned different access privileges for this purpose according to means known in the art of network management. The parallel server 3180 then either denies the addition because the user lacks access privileges, or updates parallel content table 3195, and makes the applicable modifications to parallel content 3190, optionally in a manner dictated by that user's access privileges.

Depending on the embodiment or application of this parallel web system, the access privileges or rules for when a parallel server 3180 should permit or deny modifications to parallel content 3190 vary.

For a commenting or annotation embodiment in which the parallel content is commentary upon the primary content, users may be split into groups and given access privileges for different URLs and or channels. Some users may never be allowed to change parallel content, others may only be allowed additions only, while still others may be allowed to make all changes.

In some embodiments, the rules may be determined dynamically. The simplest case is one where a governing body (a company or person) chooses which requests are granted and which are denied based upon subjective judgments. A tournament amongst users represents a slightly more complex case. Users could compete with one another in games of skill or luck to determine who gets the privilege of planting his flag or custom content in relation to a certain URL. A World Wide Web embodiment of a parallel web contest would offer the best competitors the ability to distribute their parallel content in relation to a highly popular website primary content. Less skillful competitors would be forced to settle for planting their parallel content flag on less frequented primary content websites.

In a navigational embodiment, such as the instant publishing of shared matrices under the current invention, users could compete for the right to make parallel content matrices available in relation to popular primary content websites. Alternatively, access privileges to change parallel content matrices could be allocated by other criteria such as recency of the last update, matrix size, matrix popularity, or fees.

Other Variations

Detailed illustrations of an improved scheme of organizing information by an associative thought process in accordance with the present invention have been provided above for the edification of those of ordinary skill in the art, and not as a limitation on the scope of the invention. Numerous variations and modifications within the spirit of the present invention will of course occur to those of ordinary skill in the art in view of the embodiments that have now been disclosed. For example, while in the described embodiment, the present invention is implemented for a GUI for desktop computers or local area or wide area computer networks (e.g., the Internet), the present invention may also be effectively implemented for any information appliance which can take advantage of the novel associative thought scheme of the present invention. The scope of the inventions should, therefore, be determined not with reference to the above description, but should instead be determined with reference to the appended claims, along with the full scope of equivalents to which such claims are entitled.

We claim:

1. A method for organizing and processing electronic information comprising the steps of:
    organizing the electronic information as a plurality of thoughts;
    defining a matrix of the plurality of thoughts in a network and further including a plurality of network relationships among the thoughts, wherein each thought may be related to at least one of the other thoughts, and at least one of the thoughts is directly related to one of the other thoughts;
    selecting a first thought from the plurality of thoughts to be a central thought;
    displaying on a display direct relationships between at least some of the plurality of thoughts, including an indicium of the central thought and at least one of the related thoughts;
    selecting a second thought that is related to the central thought to be a new central thought; and
    displaying an indicium of the new central thought and at least one related thought,
    wherein each of the indicia comprise a graphical icon that may be activated by a user, and wherein indicia of the thoughts on the display are rearranged upon selection of a new central thought in a manner that graphically reflects the relationship between the thoughts and the new central thought.

2. The method of claim 1, wherein the new current central thought is associated with information, the method further comprising the step of viewing, editing or processing the electronic information.

3. The method of claim 1, wherein one or more thoughts related to both the first and second thoughts are also displayed.

4. The method of claim 1, wherein at least one thought is a parent of another thought, and wherein at least one thought is a sibling of another thought, and wherein indicia of each of the thoughts and indicia of the parent and sibling relationships between the thoughts are graphically represented on the display.

5. The method of claim 2, wherein the step of viewing, editing or processing is subsequent of loading the contents of said new central thought.

6. The method of claim 5, wherein the loading step is performed automatically.

7. The method of claim 5, wherein said loading step is delayed for a period of time.

8. The method of claim 6, wherein the period of time is long enough to permit navigating to another thought before the contents of the central thought are loaded.

9. The method of claim 7, wherein the user is appraised by a visual display of the extent to which the period of time has elapsed.

10. The method of claim 1, further comprising the step of creating a file that contains a full location of a device on which the network is initially defined, that file configured so that the thought documents organized by the network are accessible from a remote device having access to the information organized by the network.

11. The method of claim 10, further comprising the steps of:
    identifying at least one thought document that does not reside in the memory or storage of a local device;
    loading selected ones of the identified thought documents to a local device;
    changing the recorded location of the loaded thought documents to reflect the new local location of the thought documents.

12. The method of claim 1, wherein the thoughts are of a plurality of thought types.

13. The method of claim 1, wherein the step of defining further comprises the step of setting sharing characteristics of at least one thought.

14. The method of claim 1, wherein said network relationships may be forgotten.

15. The method of claim 14 wherein said network relationships may be forgotten automatically in accordance with particular usage statistics.

16. The method of claim 14, wherein memory of the network relationships is of more than one type, and wherein the user may selectively display the relationships remembered by one or more of those memory types.

17. The method of claim 1, wherein the step of defining comprises adding at least one thought to the network by dragging with a pointing device from or to a thought in a plex to or from a window associated with the thought document.

18. The method of claim 1, wherein at least one thought contains more than one version of a single thought document and wherein a user may select from among these multiple versions of the thought document.

19. The method of claim 1 wherein the indicia are highlighted in a manner indicating to the user which thought will be designated should the user select the indicium over which a pointer indicium responsive to a user input means presently resides.

20. The method of claim 1 in which a Train of Thought is highlighted or otherwise made visible or differentiated from other graphical elements of the matrix.

21. The method of claim 20, wherein arrows or other indicia are used to indicate the order of the Train of Thought.

22. The method of claim 1, wherein the matrix references another matrix.

23. The method of claim 22, wherein an administrator may independently assign access privileges to each of the matrices.

24. The method of claim 1 wherein a user can divide a single matrix into one or more individual matrices.

25. The method of claim 1 wherein multiple users can simultaneously access a single matrix.

26. The method of claim 24 further comprising a method for preventing the creation of conflicting versions of a single thought document.

27. The method of claim 1 wherein the display of the thought indicia is based upon particular usage statistics.

28. The method of claim 27 wherein the thought indicia are graphically differentiated to reflect temporally-based usage statistics.

29. The method of claim 1, wherein the step of defining further comprises the step of generating a matrix based upon a hierarchical file management structure.

30. The method of claim 29, wherein the generated matrix may subsequently be modified to incorporate nonhierarchical associations among thoughts.

31. The method of claim 1 wherein the step of defining further comprises the step of generating a matrix based upon a preexisting self-referencing network.

32. The method of claim 31, wherein the generated matrix may subsequently be modified to incorporate nonhierarchical associations among thoughts.

33. The method of claim 31, wherein the self-referencing network comprises the Internet.

34. The method of claim 31, wherein said self-referencing network comprises a hypertext document.

35. The method of claim 1 wherein the step of defining is, in whole or in part, performed in response to a user's serial selection of files or Internet browsing.

36. The method of claim 1 wherein the step of defining is, in whole or in part, performed based upon the results of a database search.

37. The method of claim 36 wherein said database represents an index of content on the Internet.

38. The method of claim 31 wherein the step of generating is performed in accordance with a web crawling technique and in which the self-referencing network comprises at least one site on the World Wide Web.

39. The method of claim 1, wherein at least one file having information associated with a thought resides remotely on a server or other remote device, and wherein the user accesses the matrix from a client or other local device.

40. The method of claim 39, further comprising the steps of:
based upon the current thought and the defined matrix relationships, identifying all thoughts that could possibly be selected as a new central thought from a current plex, and all thoughts that would join the new central thought in a resulting new plex upon the selection of any one of the thoughts;
identifying the thoughts for which the desired information is presently stored at the local device; and
sending from the remote device only that data associated with each thought that could join the new plex upon the selection of a new central thought that is not already stored at the local device.

41. The method of claim 40, wherein the results of at least one of the steps of identifying are stored in a ThoughtList.

42. The method of claim 1, wherein files that store information relating to the matrix are embedded into hypertext and are accessible from hypertext.

43. The method of claim 1, wherein files that store information relating to said matrix comprise both internal and external files.

44. The method of claim 43, wherein a user can selectively convert internal files to external tiles, and can selectively convert external files to internal files.

45. The method of claim 6 wherein files containing the loaded information are saved automatically without user interaction upon the deactivation of their associated thought.

46. The method of claim 1 further comprising the step of maintaining a list of parentless thoughts so that it is unnecessary to ensure that each thought has a relationship with at least one other thought.

47. The method of claim 14 wherein all thoughts childward of a first forgotten thought and not having parent relations to any thought other than a forgotten thought are themselves forgotten.

48. The method of claim 1 further comprising the step of enabling the entry of notes relating to at least one thought, wherein the notes are loaded and saved upon the activation and deactivation of the thought to which the notes correspond.

49. The method of claim 48 wherein the notes are entered by a word processor that links at least one OLE or similar object.

50. A method for organizing and processing electronic information comprising the steps of:
organizing a plurality of thoughts;
defining a matrix comprising the plurality of thoughts and further comprising a plurality of network relationships among the thoughts, wherein at least one of the thoughts is related to one of the other thoughts;
displaying a graphical representation of the matrix, the graphical representation comprising a plurality of display icons corresponding to the thoughts, and further comprising a plurality of connecting lines corresponding to the relationships among the thoughts;
receiving a communication from an application program;
identifying at least one command within the communication, the command a request to make a particular thought a current thought; and
loading, viewing, editing or processing information associated with the current thought, wherein icons of the thoughts on the display are rearranged upon selection of the current thought in a manner that graphically reflects the relationship between the thoughts and the current thought.

51. An apparatus for organizing and processing information using a computer, said information comprising a plurality of thoughts and said apparatus comprising:
input means for defining a matrix comprising the plurality of thoughts and further comprising a plurality of network relationships among the thoughts, wherein each thought may be related to at least one other of said thoughts, and wherein at least one of said thoughts is directly related to one of the other thoughts;
display means for displaying graphical representation of direct relationships between at least some of the plurality of thought, including an indicium of a first thought as a central thought and an indicium of a second thought, said second thought having a direct relation to said first thought; and
means for enabling selection of said second thought to be a new central thought, whereby indicia of those thoughts having defined relations with said second thought will be displayed on said display in a manner that graphically reflects the relationship between those thoughts and the new central thought.

52. A computer program product for organizing and processing information using a computer, said information comprising a plurality of thoughts and said product comprising:

a computer-usable medium having computer-readable code embodied therein, said computer-readable code comprising:

a matrix definition module which is configured so that a matrix comprising the plurality of thoughts and further comprising a plurality of network relationships among the thoughts can be defined, wherein each thought may be related to at least one other of said thoughts, and wherein at least one of said thoughts is directly related to one of the other thoughts;

a display module which is configured to display graphical representation of direct relationships between at least some of the plurality of thoughts on a display, including an indicium of a first thought as a central thought and an indicium of a second thought, said second thought having a direct relation to said first thought; and a selection module which is configured to enable selection of said second thought to be a new central thought, whereby indicia of those thoughts having defined relations with said second thought will be displayed on said display in a manner that graphically reflects the relationship between those thoughts and the new central thought.

53. A system for organizing and processing information using a computer, said information comprising a plurality of thoughts, and said system comprising:

input means for defining a matrix comprising the plurality of thoughts and further comprising a plurality of network relationships among the thoughts, wherein each thought may be related to at least one other of said thoughts, and wherein at least one of said thoughts is directly related to one of the other thoughts;

a display for displaying graphical representation of direct relationships between at least some of the plurality of thoughts, including an indicium of a first thought as a central thought on the display; and an indicium of a second thought on said display, said second thought having a direct relation to said first thought, wherein a user can select said second thought to be a new central thought, whereby indicia of those thoughts having defined relations with said second thought will be displayed on said display in a manner that graphically reflects the relationship between those thoughts and the new central thought.

\* \* \* \* \*